United States Patent
Mullender et al.

(10) Patent No.: US 10,453,102 B1
(45) Date of Patent: Oct. 22, 2019

(54) CUSTOMIZED MEDIA REPRESENTATION OF AN OBJECT

(71) Applicant: Amazon Technologies, Inc., Reno, NV (US)

(72) Inventors: Matthijs Frederik Mullender, Sammamish, WA (US); Christopher Scott Antol, Marriottsville, MD (US)

(73) Assignee: Amazon Technologies, Inc., Reno, NV (US)

( * ) Notice: Subject to any disclaimer, the term of this patent is extended or adjusted under 35 U.S.C. 154(b) by 441 days.

(21) Appl. No.: 13/710,265

(22) Filed: Dec. 10, 2012

(51) Int. Cl.
*G06Q 30/00* (2012.01)
*G06Q 30/02* (2012.01)

(52) U.S. Cl.
CPC .............................. *G06Q 30/0276* (2013.01)

(58) Field of Classification Search
CPC ... G06T 15/06; G06T 15/50; H04N 21/41407; H04N 7/17318; H04N 21/812; H04N 21/47202; H04N 21/6582; H04N 21/4223; G06Q 30/02; G06Q 30/0641; G06Q 30/0633
USPC ....................................... 382/154; 348/14.02
See application file for complete search history.

(56) References Cited

U.S. PATENT DOCUMENTS

| | | | |
|---|---|---|---|
| 6,028,955 A * | 2/2000 | Cohen | G06T 15/06 382/154 |
| 7,593,602 B2 * | 9/2009 | Stentiford | G06F 17/30265 358/403 |
| 2001/0044835 A1 * | 11/2001 | Schober | G06F 8/60 709/217 |
| 2007/0159522 A1 * | 7/2007 | Neven | G06Q 30/02 348/14.02 |
| 2009/0282340 A1 * | 11/2009 | Akaike | G11B 27/105 715/732 |
| 2011/0191206 A1 * | 8/2011 | Kiarostami | G06Q 30/0641 705/26.8 |
| 2014/0092139 A1 * | 4/2014 | Sullivan | G09G 5/00 345/649 |
| 2016/0292850 A1 * | 10/2016 | Perez | G06F 3/005 |

* cited by examiner

*Primary Examiner* — Alvin L Brown
(74) *Attorney, Agent, or Firm* — Eversheds Sutherland (US) LLP

(57) ABSTRACT

Devices, systems, techniques, and computer program products are provided for customized media representation of a three-dimensional object. Such representation can be based at least on information indicative of viewing behavior or viewing preference of one or more consumers generated in response to digital-based perusal of objects, such as consumer electronics, apparel, books, toys, and the like, and/or communication resources available to a device that permits or facilitates the perusal. The customized media representation can comprise a media asset formatted according to a non-motion-picture format or a motion-picture format.

20 Claims, 13 Drawing Sheets

CUSTOMIZED MEDIA REPRESENTATION OF AN OBJECT

BACKGROUND

Web-based browsing may include visual navigation of three-dimensional objects. Such visual navigation typically comprises rendering a large number of media representations of the appearance of an object or a model thereof. Scarcity of communication resources, such as bandwidth and/or communication channels (e.g., in-band channels and/or out-of-band channels) may preclude a satisfactory perceived quality of service for consumers navigating such objects.

BRIEF DESCRIPTION OF THE DRAWINGS

The accompanying drawings are an integral part of the disclosure and are incorporated into the subject specification. The drawings illustrate example embodiments of the disclosure and, in conjunction with the description and claims, serve to explain at least in part various principles, features, or aspects of the disclosure. Certain embodiments of the disclosure are described more fully below with reference to the accompanying drawings. However, various aspects of the disclosure can be implemented in many different forms and should not be construed as limited to the implementations set forth herein. Like numbers refer to like elements throughout.

DETAILED DESCRIPTION

Figure 1:
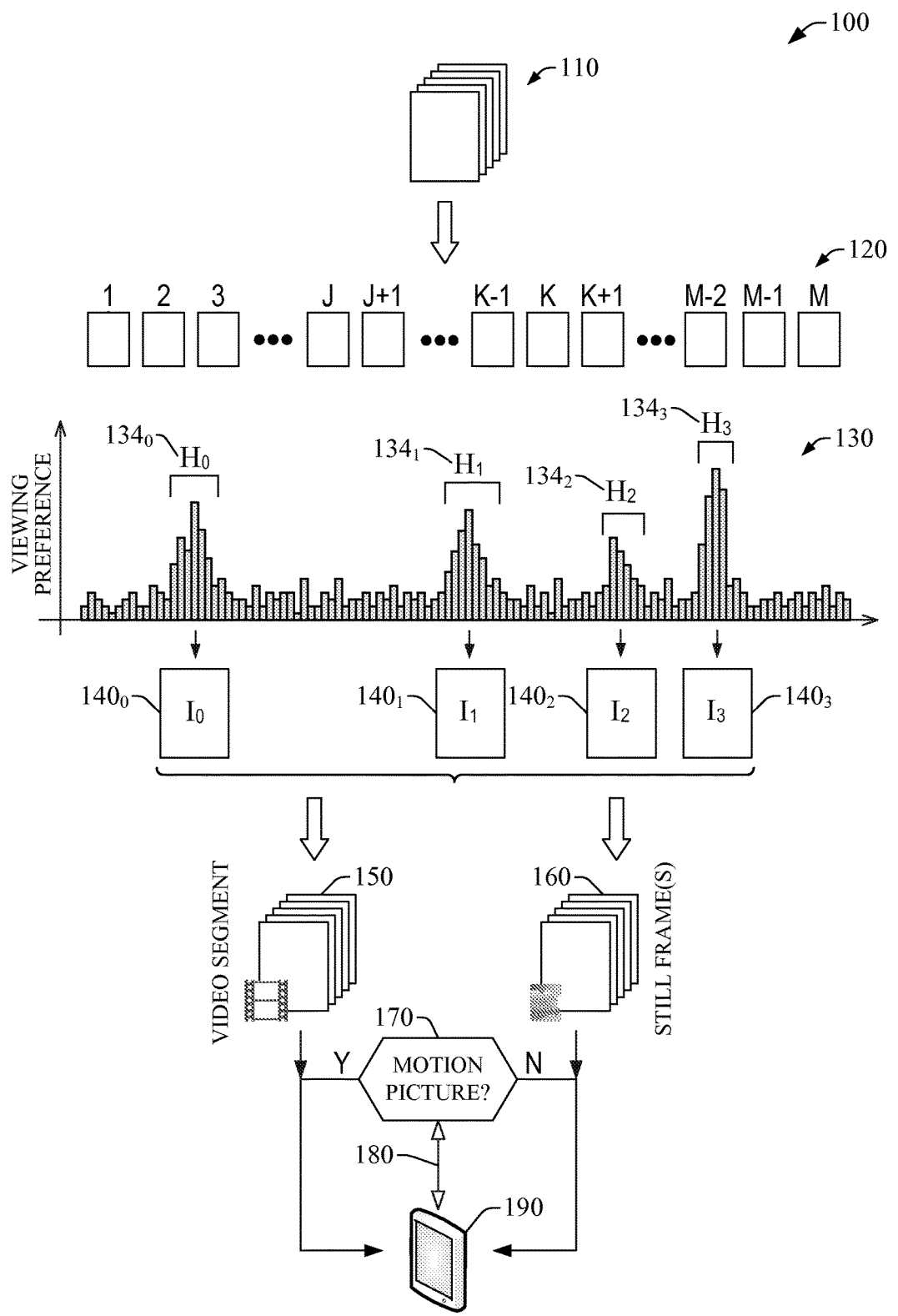
FIG. 1 presents an example customization of media representations of an object in accordance with one or more aspects of the disclosure.

The disclosure recognizes and addresses, in one aspect, the issue of exchange of large amounts of information that generally occurs during digital-based perusal of the appearance of an object. The disclosure provides devices, systems, and/or techniques for customized media representation of a three-dimensional object. The customized media representation can be based on historical information indicative of viewing behavior or viewing preference of one or more consumers (e.g., humans or autonomous intelligent machines) during digital-based perusal of objects, such as consumer electronics, apparel, books, toys, and the like. Such perusal can pertain, for example, to web-based purchases or research of a three-dimensional object. In one aspect, the historical information can comprise information indicative of a group of vantage points respective to an object. A vantage point can be associated with an image of the object, thus the historical information can include information indicative of a group of images of the object. In one scenario, the historical information can permit generation of viewing statistics—e.g., frequency of occurrence of a vantage point, viewing interval of a vantage point, etc.—and determination of one or more groups of marketable images of the object. A marketable image can be an image that is collectively favored by consumers that peruse the object. A group of marketable images can be referred to as a "hotspot" of the object and, in one aspect, a marketable image in the group can be selected to represent the hotspot. Accordingly, several groups of marketable images can yield a plurality of selected marketable images of the object.

For a specific group of marketable images, various selection criteria can be utilized to identify an image representative of the group. A collection of one or more representative images can be utilized to generate a media asset, such as a non-motion-picture bundle or a motion-picture segment, that can be supplied to an end-user device (e.g., user equipment, such as a mobile tablet) for rendering thereon in response to perusal or navigation of the three-dimensional object. The media asset can be generated in a manner that is suitable for efficient communication to the end-user device according to one or more communication resources available to such device, for example. It should be appreciated that selection of representative marketable images can permit reducing the number of media assets (e.g., digital images) associated with the three-dimensional object that may be included in perusal or navigation of the object. In addition to the selection, generation of media assets comprising one or more of the selected marketable images based at least on communication resources available to a device that can consume (e.g., access and render) the media assets can permit or facilitate customization of the media representation of a three-dimensional object.

The disclosed operational environments (e.g., system(s), device(s), etc.) and methods may take the form of an entirely hardware embodiment, an entirely software embodiment, or an embodiment combining hardware and software features. Furthermore, the methods and systems may take the form of a computer program product on a computer-readable non-transitory storage medium having computer-accessible instructions (e.g., computer-readable and/or computer-executable instructions), such as computer software, embodied in the computer-readable non-transitory storage medium. Any suitable computer non-transitory storage medium may be utilized to form the computer program product.

Embodiments of the operational environments and methods are described herein with reference to block diagrams and flowchart illustrations of methods, systems, apparatuses and computer program products. It can be understood that each block of the block diagrams and flowchart illustrations, and combinations of blocks in the block diagrams and flowchart illustrations, respectively, can be implemented by computer-accessible instructions. In certain implementations, the computer-accessible instructions may be loaded or otherwise incorporated into a general purpose computer, special purpose computer, or other programmable information processing apparatus to produce a particular machine, such that the operations or functions specified in the flowchart block or blocks can be implemented in response to execution at the computer or processing apparatus.

Referring to the drawings, FIG. 1 illustrates various example elements of customization of media representations of an object in accordance with one or more aspects of the disclosure. The object generally is a three-dimensional object and a plurality of media assets associated with the object can be available (e.g., persisted in the network repository or memory thereof) for digital-based perusal or research of the object. A media asset comprises digital content (digital image(s), digital audio, combinations thereof, etc.) and at least a portion of the plurality of media assets can be generated in response to digital-based navigation or research of the object by several distinct end-users. Accordingly, in one aspect, it should be appreciated that at least the portion of media assets can capture and/or can reveal perusal behavior associated with viewers of the object. The plurality of media assets can comprise a plurality of digital images 110 of the object, where each of such digital images can correspond to a view of the object at certain vantage point. In one scenario, the plurality of digital images 110 can be indexed for generation of viewing statistics. For example, the plurality of digital images 110 can comprise M images indexed in a set 120 of images indexed from 1 to M, with M an integer greater than the unity, and the viewing statistics associated with such images can comprise a histogram 130 of viewing instances of the object. In one aspect, a viewing instance of the object is represented by a view of the object within a predetermined range of vantage points, where such range represents a view bin for the histogram 130. A vantage point, or vantage point vector, $\bar{\omega}$ can be defined by a radial coordinate (or radius $\rho$), an azimuthal coordinate (or azimuth angle $\theta$), and a polar coordinate (or zenith angle $\phi$): $\bar{\omega}=(\rho,\theta,\phi)$. Accordingly, in one aspect, a view bin can be defined as a vector $\Delta\bar{\omega}=(\Delta\rho,\Delta\theta,\Delta\phi)$. Several images of the set 120 can be contained within a view bin depending on respective vantage point of such images.

As illustrated in histogram 130, certain viewing instances of an object can be more frequent than others, conveying that certain images associated with certain views of the object may be more marketable than others. Prominent viewing instances can form groups of marketable views. For instance, four groups of views appear more prominently: group $H_0$ 134$_0$, group $H_1$ 134$_1$, group $H_2$ 134$_2$, and group $H_3$ 134$_3$. The groups or marketable views have respectively associated digital images of the set 120, and each group can have specific viewing intensities or viewing strengths determined at least in part by the frequency of viewing instances of the respective group. As described herein, such groups of marketable views (or marketable images) can be referred to as hotspots of the object.

For a specific group of marketable views, or hotspot, a representative view (or associated digital image) can be selected according to one or more selection criteria. For example, blocks 140$_0$-140$_3$ represent, respectively, images $1_0$ through $1_3$ which can be representative of groups $H_0$ through $H_3$. In one aspect, a selection criterion can be "highest viewing intensity bin." Thus, an image in a view bin that has the highest viewing intensity of a hotspot can be selected as the representative image of the group. As illustrated, images $1_0$ through $1_3$ are selected according to such selection criterion. In another aspect, the selection criterion can be "average viewing intensity bin" and thus an image in a view bin that has the average viewing intensity of a hotspot can be selected as the representative image of the hotspot. It should be appreciated that other selection criteria can be contemplated and can yield a set of digital images representative of the specific group of marketable views.

Selection of representative views, or digital images, of respective hotspots of an object can permit of facilitate simplification of a media representation of the object. Rather than supplying a large amount of information indicative of a large number of media assets representative of the object—including non-marketable views of the object that are unlikely to be appreciated by a consumer—the collective consumer preference for the representative views, as suggested or evidenced by the hotspots, can permit supplying a limited amount of information indicative of such views.

In addition, availability of the representative views and related formatted representations comprising a group of non-motion-picture images (e.g., still frame(s) 160) or a motion-picture segment (e.g., video segment 150) can permit or facilitate customization of a media representation of the object. In one aspect, a non-motion-picture image can be formatted according to the Joint Photographic Experts Group (JPEG) format or substantially any digital frame image format. In another aspect, the motion-picture segment can be formatted according to substantially any video format, including Moving Picture Experts Group Phase 4 (MPEG-4), H.264, recommendation (Rec.) 601, or the like. As an illustration of customization, in one scenario, a determination block 170 can analyze or otherwise assess a communication resource (e.g., bandwidth, available communication channels, etc.) and/or a communication condition (such as a network congestion level) associated with a device 190. In one aspect, the device 190 is an electronic device having certain level of computational resources, such as memory, processor(s) having a specific processing speed, and a bus architecture for exchange of information and/or signaling in analog format or digital format. In certain embodiments, the device 190 can be embodied in or can comprise user equipment, such as mobile computing devices including an electronic book reader (e-reader or ebook reader) or other mobile tablets, a smartphone, wearable devices, or the like. The communication resource is represented with open arrows 180. Further to the illustration, based on outcome of the analysis or assessment, the determination block 170 can customize or permit customization of a media representation of the object in a manner that is suitable for efficient digital-based perusal of the object at the device 190. For example, for a communication resource that is available to the device 190 and exceeds a predetermined threshold, the determination block 170 can ascertain that transmission of a motion-picture segment (e.g., video segment 150) can be suitable for efficient digital-based perusal of the object.

Figure 2:
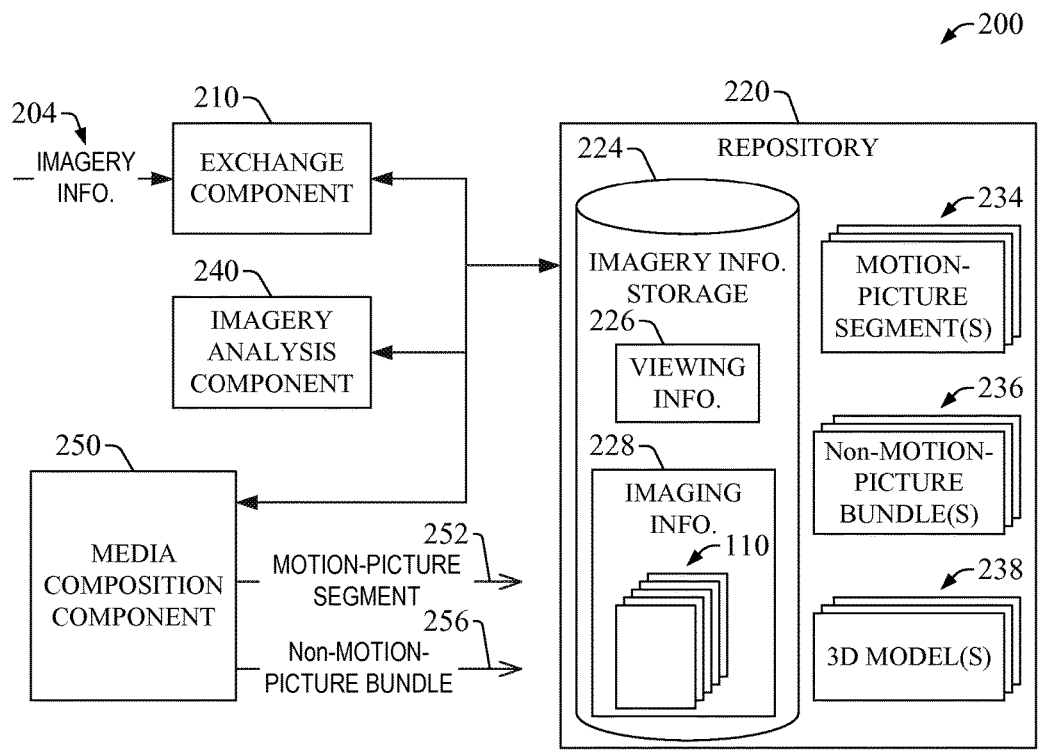
FIG. 2 illustrates an example operational environment in accordance with one or more aspects of the disclosure.
Figure 4:
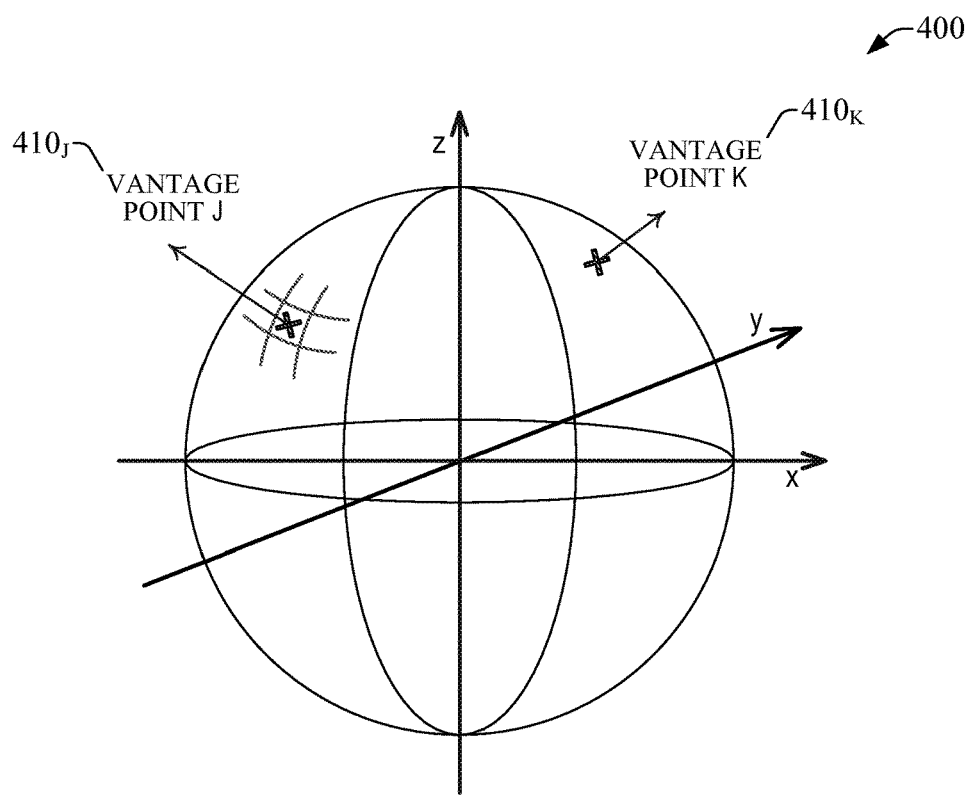
FIG. 4 illustrates an example representation of a vantage point domain in accordance with one or more aspects of the disclosure.

FIG. 2 presents a high-level block diagram of an example operational environment 200 for generation of media representations of a three-dimensional object in accordance with one or more aspects of the disclosure. The example operational environment 200 can comprise an exchange component 210 that can receive or otherwise access imagery information 204 (e.g., data, metadata, and/or signaling) indicative of a plurality of vantage points respective to a three-dimensional object. As described herein, each of the plurality of vantage points can be associated with each image of a plurality of digital images of the three-dimensional object. In one aspect, a digital image (also referred to as image) of the plurality of images of the object corresponds to a view of the object at the vantage point associated with the image. For example, FIG. 4 illustrates two vantage points, represented with crosses: vantage point J 410$_J$ and vantage point K $410_K$, which can be formally represented by vectors $\bar{\omega}_J=(\rho,\theta J,\phi J)$ and $\bar{\omega}_K=(\rho,\theta_K,\phi_K)$, respectively, on a viewpoint sphere 400.

The plurality of digital images can comprise or can embody the plurality of digital images 110. It should be appreciated that, in one aspect, the imagery information 204 can comprise information indicative of the plurality of digital images of the three-dimensional object. The imagery information 204 can be generated in response to digital-based perusal (or digital-based navigation) of the three-dimensional object. In one aspect, at least a portion of the imagery information 204 can be generated by an application server (e.g., a content server) that can generate media assets for consumption at an end-user device (e.g., device 190).

The exchange component 210 can communicate (e.g., transmit) at least a portion of the imagery information 204 to a repository 220, which can retain at least the portion of the imagery information 204 in a memory element 224 (e.g., a register, a memory page, a cache, a file, a database, etc.). As illustrated, the memory element 224 is referred to as imagery information (info.) storage 224. In one aspect, at least the portion of the imagery information 204 can be retained in a memory element 228 (referred to as imaging info. 228). For example, at least the portion of the imagery information 204 can include information indicative of the plurality of the digital images 110. An imagery analysis component 240 can receive or otherwise access (e.g., query and receive) at least a portion of the information retained in the imaging information 228. In addition or in the alternative, the exchange component 210 can communicate at least the portion of the imagery information 204 to the imagery analysis component 240.

In one implementation, the imagery analysis component 240 can analyze or otherwise process information contained in the imaging information 228 and, in response, it can determine a viewing relevancy weight for each view associated with a vantage point in the plurality of vantage points respective to the three-dimensional object related to the imaging information 228. In one aspect, the viewing relevancy weight of a view can be a numeric value representative of a zoom level (e.g., value of p) associated with a vantage point specific to a view. In another aspect, the viewing relevancy weight of a view can be a numeric value representative of a viewing time for the view. In certain implementations, such value can be greater than or equal to zero and less or equal than unity. In one aspect, the viewing time can be or can comprise the time interval elapsed during rendering, at an end-user device (such as device 190), of an image of the object at the vantage point associated with the view. In addition or in the alternative, to determine the viewing relevancy weight of a view, the imagery analysis component 240 can assign a value (e.g., a real number) of a predetermined function of the viewing time for the view to be indicative or representative of the viewing relevancy weight for the vantage point associated with the view. In one scenario, a view may be shortlived, having a brief viewing time, thus such view can be assigned a small viewing relevancy weight in order to represent a low level of consumer preference for the vantage point associated with the view. The imagery analysis component 240 can retain information (e.g., data and/or metadata) indicative of one or more viewing relevancy weights respectively associated with one or more views of the three-dimensional object.

In addition or in the alternative, the imagery analysis component 240 can determine a number of instances of each vantage point in the plurality of vantage points respective to the three-dimensional object. To at least such end, in one aspect, the imagery analysis component 240 can determine a number of occurrences of a vantage point in such plurality within a range of vantage points defined by a reference vantage point $\bar{\omega}_0+n(\Delta\bar{\omega})$ and a section of a solid angle relative to $\bar{\omega}_0$ and determined by the view bin $\Delta\bar{\omega}$. Here, n is an integer number. The imagery analysis component 240 can iterate through the index n until the vantage points of the plurality of vantage points for which such determination has been made are exhausted. It should be appreciated that, in one aspect, the determination of the number of instances of a vantage point in the plurality of vantage points defines a group of digital images associated with the vantage points that yield such number. As described herein, information indicative of such plurality can be retained in the imaging information 228 and can include information indicative of the plurality of the digital images 110 associated with respective vantage points.

The viewing relevancy weight of a view can permit adjusting the number of instances of a vantage point in order to establish a viewing preference weight. In one scenario, a view may be shortlived, having a brief viewing time, thus a large number of instances of shortlived views may skew or otherwise improperly represent a level of consumers' preference for the vantage point associated with the view. Accordingly, in one implementation, a shortlived view associated with a vantage point can be contribute less than a unity to a count of instances of the vantage point. Thus, in one embodiment, a normalized number of instances $M_{\Delta\Omega}$ of a vantage point i within a section of a solid angle $\Delta\Omega$ defined by a view bin $\Delta\bar{\omega}$ can be determined as follows: $M_{\Delta\Omega}=\Sigma_{i\in\Delta\Omega} w_i$, where $w_i$ is the viewing relevance weight of the view associated with the vantage point. A normalized number of instances can be one embodiment of a viewing preference weight associated with a vantage point or related view or digital image. In one implementation, the imagery analysis component 240 can determine a viewing preference weight for each vantage point in a plurality of vantage points respective to a three-dimensional object based at least on the viewing relevancy weight of the vantage point and the number of instances of the vantage point. The imagery analysis component 240 can retain information (e.g., data and/or metadata) indicative of one or more viewing preference weights respectively associated with one or more views of the three-dimensional object.

Figure 5:
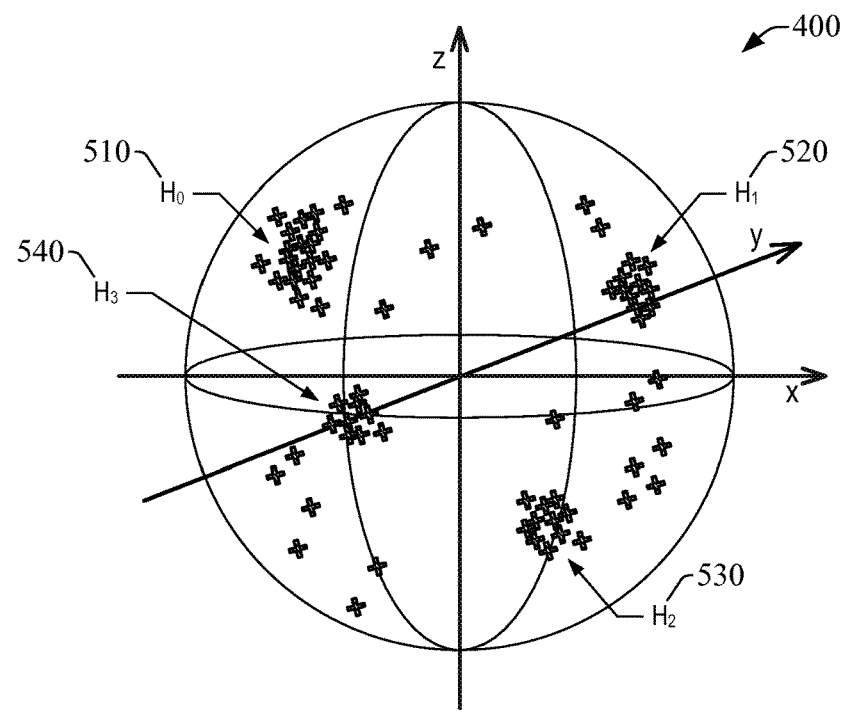
FIG. 5 illustrates an example representation of views of an object in vantage point domain in accordance with one or more aspects of the disclosure.
Figure 6:
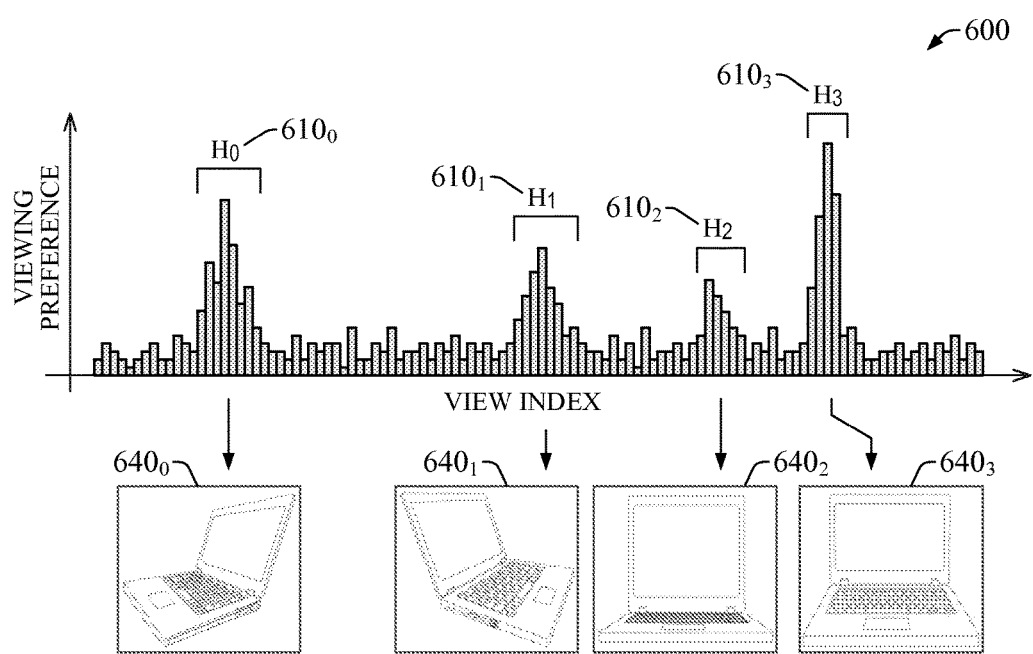
FIG. 6 illustrates an example representative histogram of viewing information and selected views in accordance with one or more aspects of the disclosure.

A distribution of viewing preference weights over vantage points, or related views, can reveal viewing hotspots of a three-dimensional object. For example, FIG. 5 illustrates a distribution of vantage points, represented with crosses, over a portion of vantage point domain having a fixed distance p from the object, assumed to be concentrated at the origin of the viewpoint sphere 400. As described herein, the distribution of vantage points can form groups of vantage points: $H_0$ 510, $H_1$ 520, $H_2$ 530, and $H_3$ 540. In one aspect, maxima (either narrow or broad) or higher values of the distribution can be indicative of a viewing hotspot. In certain implementations, the distribution of viewing preference weights can be represented with a histogram. As an illustration, FIG. 6 presents an example histogram 600 of viewing preference weights in which four hotspots can be identified: group $H_0$ $610_0$, group $H_1$ $610_1$, group $H_2$ $610_2$, and group $H_3$ $610_3$. It should be appreciated that, for the sake of simplicity of illustration, the example histogram 600 replicates the example histogram 130.

In one embodiment, to determine a hotspot, the imagery analysis component 240 can analyze the distribution of viewing preferences and, in response, can determine a group of vantage points (e.g., group $H_0$ $610_0$) in a plurality of vantage points respective to a three-dimensional object based at least on the viewing preference weight of each vantage point in the group of vantage points. In one scenario, the group of vantage points can comprise several vantage points that form a broad maximum of the distribution of viewing preference weights. As described herein, a viewing hotspot can comprise such group of vantage points, which can represent views that are collectively favored by consumers perusing the three-dimensional object in an end-user device (e.g., device 190). Accordingly, the imagery analysis component 240 can classify an image of the three-dimensional object associated with a vantage point in the group of vantage points as a marketable view of the object. It should be appreciated that, in one aspect, the imagery analysis component 240 can determine one or more additional groups of vantage points (e.g., group $H_2$ 610$_2$ and group $H_3$ 610$_3$) in the plurality of vantage points respective to the three-dimensional object based at least on the viewing preference weight of each vantage point in the at least one alternative group of vantage points. For at least one of the one or more additional groups, in one aspect, the imagery analysis component 240 can classify at least one image of the three-dimensional object associated with at least one vantage point in the one or more additional groups of vantage points as a respective alternative marketable view of the object.

Identification of a plurality of groups of vantage points and related groups of images of a three-dimensional object, and classification of at least one image in each of the one or more groups can result, in one aspect, in generation of a plurality of marketable views of the three-dimensional object. In certain implementations, classification of an image can include selection of the image based at least in part on one or more selection criteria. The selection criteria can be retained in a memory element (not shown) in the repository 220. FIG. 6 illustrates four example images 640$_1$-640$_3$ that represent four marketable views of a three-dimensional object that may result from the classification described herein. Each of the example images 640$_1$-640$_3$ conveys a distinct view of a laptop computer exemplifying the three-dimensional object. It should be noted that such images embody, respectively, representative blocks 140$_1$-140$_3$. In addition or in the alternative, classification can include incorporation of identification information (e.g., data and/or metadata) to a data object, or data structure, representative or indicative of a classified digital image. The identification information can be retained in the imaging information 228. In one aspect, the identification information can permit or facilitate tagging a digital image of a plurality of digital images as a marketable image associated with a marketable view of the three-dimensional object.

As illustrated, the operational environment 200 can comprise a media composition component 250 that can access (e.g., receive or otherwise collect) one or more marketable images of a three-dimensional object. The media composition component 250 can process the one or more marketable images and, in response, can compose a media asset having at least one image of such marketable images. In addition, the media composition component 250 can transmit the media asset to the repository 220 to be retained (e.g., persisted) therein. In one aspect, the media asset can be embodied in or can comprise a non-motion-picture bundle 256 (e.g., still frame(s) 160). In another aspect, the media asset can be embodied in or can comprise a motion-picture segment 252 (e.g., video segment 150). Non-motion-picture bundles can be formatted according to the Joint Photographic Experts Group (JPEG) format or substantially any digital frame image format, and can be retained in one or more elements 236 (referred to as non-motion-picture bundle(s) 236), whereas motion-picture segments can be formatted in Moving Picture Experts Group Phase 4 (MPEG-4), H.264, recommendation (Rec.) 601, or substantially any other video format, and can be retained in one or more memory elements 234 (referred to as motion-picture segment(s) 234). In yet another aspect, the media asset can be embodied or can comprise a three-dimensional (3D) model, such as a full 3D model, of the three-dimensional object. The three-dimensional model of the object can comprise information indicative of the three-dimensional object and can permit or facilitate perusal or navigation thereof.

Figure 3:
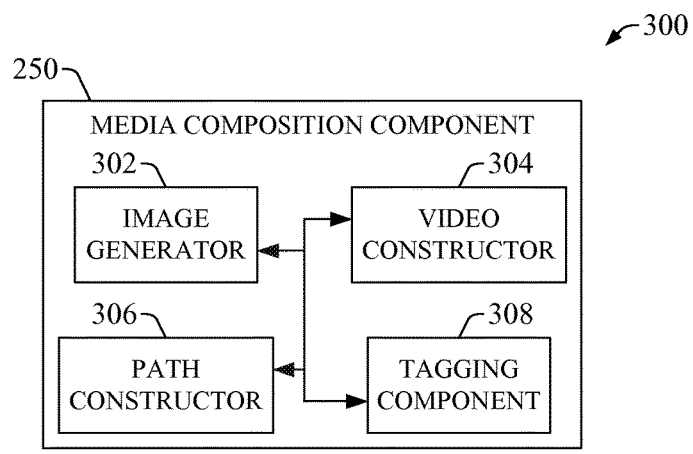
FIG. 3 illustrates an example media composition component in accordance with one or more aspects of the disclosure.

In one aspect, to compose a non-motion-picture bundle 256, the media composition component 250 can generate an information object, or information structure, having information (e.g., data and/or metadata) indicative of one or more marketable images. The media composition component 250 can format at least a portion of such information according to at least one delivery format suitable for communication of a digital image. In addition, in one implementation, the information can comprise metadata (e.g., a semantic value, as described herein) that can permit or facilitate consumption (e.g., rendition, navigation, rendition and navigation) of the non-motion-picture bundle 256. In certain embodiments, e.g., example embodiment 300 shown in FIG. 3, the media composition component 250 can comprise an image generator component 302 (also referred to as image generator 252) that can generate the information structure indicative of the non-motion-picture bundle 256.

In another aspect, to compose a motion-picture segment 252, the media composition component 250 can generate an information object, or information structure, having information (e.g., data and/or metadata) indicative of a plurality of marketable images and at least one non-marketable image. It should be appreciated that, in one aspect, the at least one non-marketable image can permit or facilitate a visual transition between two or more of the plurality of marketable images, thus permitting or facilitating formation of a motion-picture segment suitable for consumption at an end-user device (e.g., device 190). As an illustration, the motion-picture segment can be considered suitably formed for consumption in a scenario in which transition between the two or more marketable images is smooth, as perceived by a consumer consuming such segment at the end-user device. The media composition component 250 can format at least a portion of such information according to at least one delivery format suitable for communication of two or more digital images as a motion-picture segment. In addition, in one implementation, the information can comprise metadata (e.g., a semantic value, as described herein) that can permit or facilitate consumption (e.g., rendition, navigation, rendition and navigation) of the motion-picture segment 252.

In certain embodiments, e.g., example embodiment 300, the media composition component 250 can comprise a video constructor component 304 (also referred to as video constructor 304) that can generate the information structure indicative of the motion-picture segment 252. To at least such end, in one aspect, the video constructor 304 can receive or otherwise access information indicative of one or more non-marketable images, corresponding to one or more non-marketable views, from a path constructor component 306 (also referred to as path constructor 306). In one implementation, the path constructor 306 can generate a path in vantage point domain (e.g., a sphere containing a range of vantage points $\{\overline{\omega}_0\}$), where the path can connect at least two marketable views of the plurality of marketable views accessed by the media composition component 250, for example. In one aspect, the path constructor 306 can generate a path from a first vantage point (or associated first view) to a second vantage point (or associated second view) along the shortest path in Euclidian three-dimensional space, which is the space that contains the object that is viewed. Similarly, in another aspect, the path constructor 306 can generate a path from the first vantage point to the second vantage point along a spherical, cylindrical, or other two-dimensional topology defined in three-dimensional space. The path constructor 306 can compute a shortest path based at least on the relative position on vantage point domain of a pair of hotspots to be linked by the shortest path.

Figure 7:
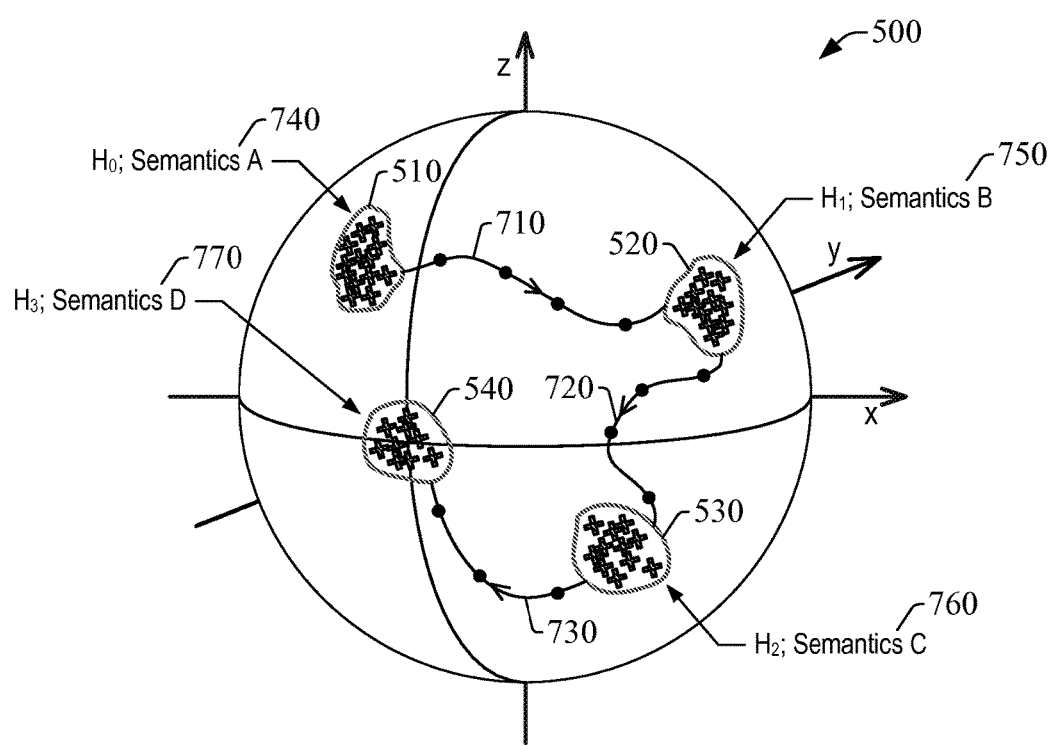
FIG. 7 illustrates an example representation of paths connecting groups of views in vantage point domain in accordance with one or more aspects of the disclosure.

Generation of a path connecting two vantage points in vantage point domain can permit generation of views between such vantage points. These views can be referred to as intermediate views and can permit or facilitate generation a motion-picture segment. In one aspect, a path between two hotspots can comprise a plurality of selected non-marketable vantages points (or views) having a plurality of images of the object respectively associated with such vantage points. FIG. 7 illustrates three examples paths 710, 720, and 730 that connect (in vantage point domain), respectively, hotspot $H_0$ 510 to hotspot $H_1$ 520, hotspot $H_1$ 520 to hotspot $H_2$ 530, and hotspot $H_2$ 530 to hotspot $H_0$ 540. Respective boundaries of the hotspots 510-540 can be defined according to one or more criteria. For example, the boundary of a hotspot can be defined as a boundary of a closed surface on the viewing sphere 400 that contains substantially all vantage points in the hotspot. As another example, the boundary of a hotspot can be defined as a line on the surface of the viewpoint sphere 400 that, at each point, defines a geodesic segment having a predetermined length measured from the geometric centroid of the distribution of vantage points in the hotspot. In addition, selected non-marketable vantage points are illustrated with solid circles in each of the paths sketched in FIG. 7.

In one implementation, the video constructor 304 can compose a media asset, e.g., the motion-picture segment 252, comprising the plurality of non-marketable images—associated with the plurality of selected non-marketable views—and the at least two marketable views of the plurality of marketable views. In one aspect, as described herein, the media asset can be suitable for transmission to a destination device (e.g., an end-user device, such as device 190) having specific communication resources. It should be appreciated that as the number of images in the plurality of non-marketable views increases, the motion-picture segment 252 can become more suited for consumption at the destination device. Yet, a larger number of non-marketable images can increase a demand for communication resources available to the destination device in order for the motion-picture segment 252 (or any other motion-picture segment of the disclosure), to be efficiently transmitted to the destination device. Accordingly, in one embodiment, the video constructor 304 can determine (based on cost-benefit analysis, for example) an adequate number of non-marketable views included in the generation of the motion-picture segment 252. In certain implementations, the video constructor 304 can compose a media asset (such as the motion-picture segment 252) having a constant rendering speed along a path that contains the plurality of non-marketable images. In other implementations, the composed media asset can have a variable rendering speed. For example, the video constructor 304 can compose a media asset that, in response to playback, can render images representing an object's viewpoint moving along a path between two hotspots at increasing speed (e.g., accelerating) away from the first hotspot and decreasing speed (e.g., decelerating) towards the second hotspot.

In one embodiment, as part of processing the one or more marketable images, for example, the media composition component 250 can assign a semantic value to at least one (e.g., one, more than one, each) of the one or more marketable images or related marketable view(s). In a scenario in which the media composition component 250 accesses a plurality of marketable images (e.g., $610_0$, $610_1$, $610_2$, and $610_3$), the media composition component 250 can assign a semantic value to each of the one or more marketable images, thus generating a plurality of semantic values for the object. In another scenario illustrated in FIG. 7, the media composition component 250 can assign a semantic value to a plurality of marketable views contained in a hotspot: hotspots $H_0$, $H_1$, $H_2$, and $H_3$ can be assigned, respectively, semantics A 740, semantics B 750, semantics C 760, and semantics D 770. In certain implementations a semantic value can comprise metadata, such as a string value; yet, other format instances can be contemplated for the semantic value. A semantic value can be specific to a marketable view and can represent, for example, information indicative of a feature of the three-dimensional object. It should be appreciated that, in one aspect, the semantic value can abstract specific details of the feature, providing a generic representation of the feature. For instance, for a three-dimensional object embodied in or comprising user equipment, such as a laptop computer (see, e.g., FIG. 6), a semantic value can be "connectors," and can be specific to a marketable view of the user equipment conveying one or more network or peripheral adapters of the user equipment. As another example, a semantic value can be "most popular" and can be associated with a marketable view selected from a hotspot having the highest or substantially highest (e.g., second highest) intensity strength.

In view of at least its generic nature, a first semantic value can associate a marketable view of a first three-dimensional object with a second three-dimensional object having at least one second semantic value substantially the same as the first semantic value. Thus, in one aspect, the first semantic value can predict or permit predicting a marketable view of the second three-dimensional object based at least on a marketable view associated with the first semantic value. As an illustration, a marketable view of a laptop computer can be tagged with the semantic value "connectors." Such semantic value can be associated with a handheld device (e.g., gaming console, mobile tablet) having one or more types of connectors (e.g., μUSB ports, 32-pin ports, etc.) and, in response, a vantage point of the marketable view can be adopted as or predicted to provide a marketable view for the handheld device. In one embodiment, e.g., example embodiment 300, the media composition component 250 can comprise a tagging component 308 that can assign a semantic value to a marketable view accessed by the media composition component 250. In addition, as described herein, the media composition component 250 can predict at least one marketable view for an alternative three-dimensional object based at least on one or more of the plurality of semantic values for a three-dimensional object.

Figure 8:
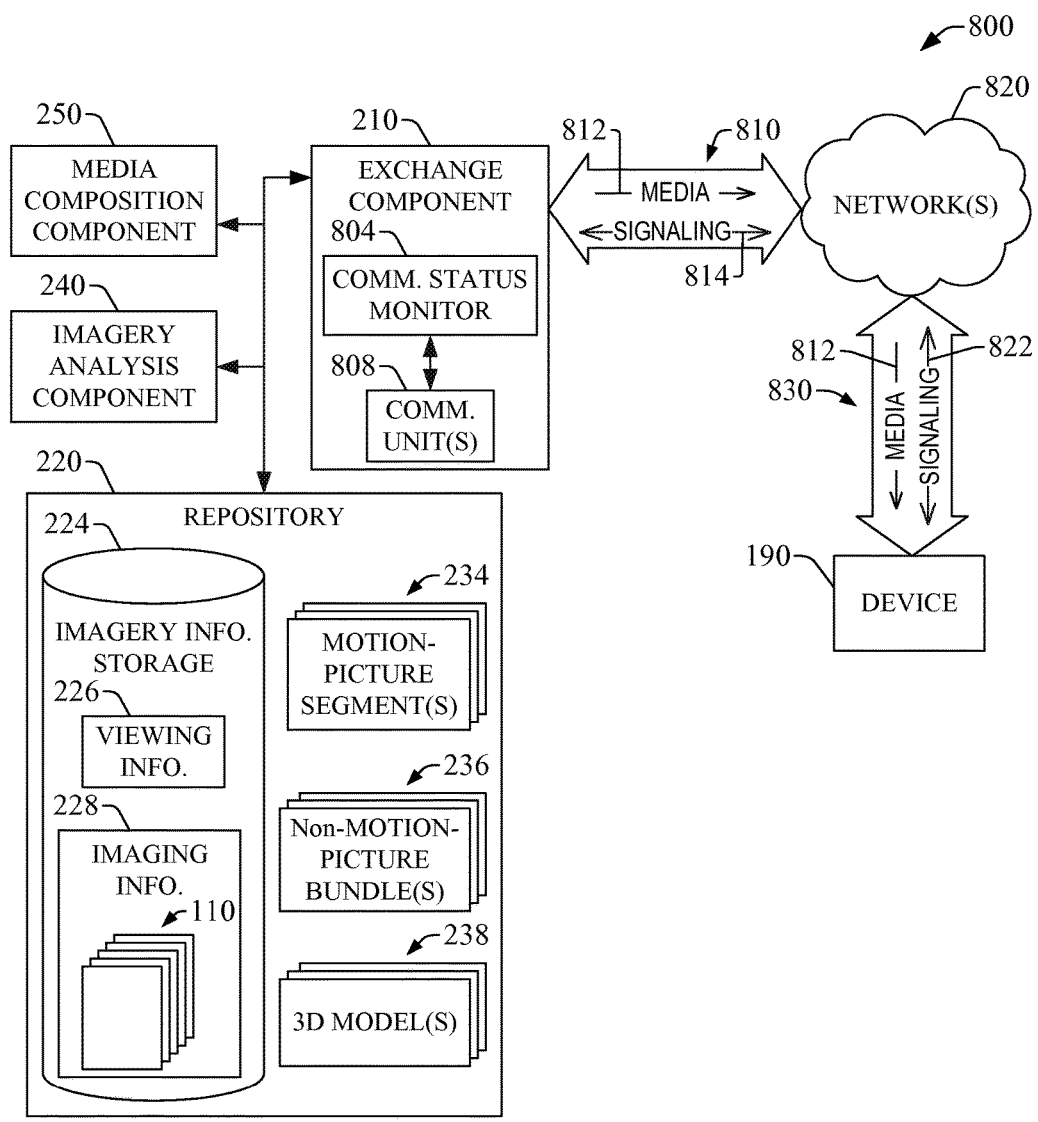
FIG. 8 illustrates an example operational environment for communication of a customized media representation of an object.

FIG. 8 presents a high-level block diagram of an example operational environment 800 for customization of a media representation of a three-dimensional object in accordance with one or more aspects of the disclosure. The example operational 800 comprises the exchange component 210 which, as illustrated, can include one or more communication units 808 and a communication status monitoring component 804 (also referred to as communication status monitor 804). At least one unit of the one or more communication units 808 can permit or facilitate communication (e.g., reception, transmission, or exchange) of information between the exchange component 210 and the device 190 via one or more networks 820. The information can comprise data, metadata, and/or signaling configured to be communicated in analogic format and/or digital format. In one aspect, the information can comprise media 812 and/or signaling 814. The at least one communication unit can comprise electronic circuitry (e.g., a transceiver, a modem, an encoder, a decoder, a multiplexer, a demultiplexer, a network adapter, a communication chipset, combinations thereof, or the like) suitable to communicate the information wirelessly or via a wireline medium. In one aspect, to at least communicate information, the at least one unit can be functionally coupled (e.g., communicatively coupled) with the one or more networks 820 via traffic and signaling pipes 810, which can comprise an uplink (UL) and a downlink (DL) for communication, respectively, from and to the network(s) 820. The traffic and signaling pipes 810 can comprise one or more wireline links, such as optical fiber line(s), twisted-pair line(s), T1/E1 phone line(s), digital subscriber line(s) (DSL(s)) either synchronous or asynchronous, asymmetric DSL(s), or coaxial cable line(s), combinations thereof, or the like. In addition or in the alternative, the traffic and signaling pipe 810 can comprise wireless links, such as line-of-sight (LOS) link(s), including point-to-point link(s), and/or non-LOS link(s). In certain implementations, the traffic and signaling pipes 810 can include one or more reference links or interfaces and network elements associated thereto. Similarly, network(s) 820 can comprise one or more wireline networks (e.g., content distribution networks, telecommunication networks, combinations thereof, and the like) and/or one or more wireless networks (such as terrestrial radio communication network(s) and/or deep-space satellite-based network). One or more of the network(s) 820 can be functionally coupled to the device 190 via traffic and signaling pipes 830, which can comprise a wireless and/or wireline UL, and a wireless and/or wireline DL. In one aspect, one or more network elements (e.g., a router or gateway, a server, or the like) can relay information, such as media 812, from the exchange component 210 to the device 190, and/or from the device 190 to the exchange component 210.

In one aspect, the exchange component 210 can receive or otherwise access information indicative of a communication resource available to the device 190 (e.g., user equipment, such as an ebook reader or other mobile tablet). Such information can be based (e.g., gleaned from) at least in part on signaling 822 transmitted by the device 190. In certain scenarios, an amount of a communication resource or throughput thereof can be estimated by measuring the time elapsed between transmission and reception of a representative amount of information (e.g., payload data). The measured time can embody or can comprise the information indicative of the communication resource available to the device 190. It should be appreciated that, in certain implementations, the exchange component 210 can generate the information indicative of a communication resource available to the device 190. Based at least on the communication resource, the exchange component 210 can configure a content delivery format—e.g., non-motion-picture format or motion-picture format—to transmit at least one view of a plurality of marketable views of a three-dimensional object. As described herein, the at least one view can be transmitted in response to rendering of a digital representation of the three-dimensional object and/or digital-based perusal thereof, for example. In addition, each of the plurality of marketable views can comprise a digital image of the object from a specific vantage point.

In certain implementations, at least to configure the content delivery format, the exchange component 210 can ascertain that the communication resource is less than a resource threshold (which can be predetermined, for example). In one implementation, the communication status monitor 804 can receive at least a portion of such information from a unit of the communication unit(s) 808, and can ascertain that the communication resource is less than the predetermined communication threshold. In response to ascertaining that the communication resource is less that the predetermined threshold, the exchange component 210 can select the non-motion-picture format. In the alternative, the exchange component 210, via the communication status monitor 804, for example, can ascertain that the communication resource is greater than or equal to another resource threshold (which can be substantially equal or greater than the predetermined resource threshold) and, in response, the exchange component 210 can select a motion-picture delivery format.

It should be appreciated that configuration of the content deliver format according to the communication resource embodies or comprises customization of a representation of the three-dimensional object at the device 190. In particular, yet not exclusively, configuration of the delivery format can permit or facilitate the exchange component 210 to supply (e.g., transmit) the at least one view of the plurality of marketable views according to the delivery format. In one aspect, the delivery format can dictate a specific media asset that is to be supplied to the device 190, wherein the media asset can comprise at least one image associated with the at least one view. In a scenario in which the non-motion-picture format is configured, the media asset can be or can comprise a non-motion-picture bundle (e.g., one of the bundles retained in the memory element 236). In the alternative, in a scenario in which the motion-picture format is configured, the media asset to be supplied can be or can comprise a motion-picture segment (e.g., one of the media segments in the memory element 234). In such scenarios, in one aspect, the exchange component 210 can access or otherwise receive the media asset comprising the at least one view of the plurality of marketable views.

In one implementation, to supply the at least one view of the plurality of marketable views, the exchange component 210 can transmit the media asset containing the at least one image via a unit of the communication unit(s) 808. As an illustration, in the foregoing scenario in which the media asset can comprise the motion-picture segment, the exchange component 210 can transmit a plurality of specific views of the three-dimensional object to the device 190 (which can be referred to as the destination device, for example) according to the motion-picture delivery format. The plurality of specific views can comprise the at least one view of the plurality of marketable views. As another illustration, in the foregoing scenario in which the media asset can comprise the non-motion-picture bundle, the exchange component 210 can transmit each of the views in such bundle to the device 190.

Figure 9A:
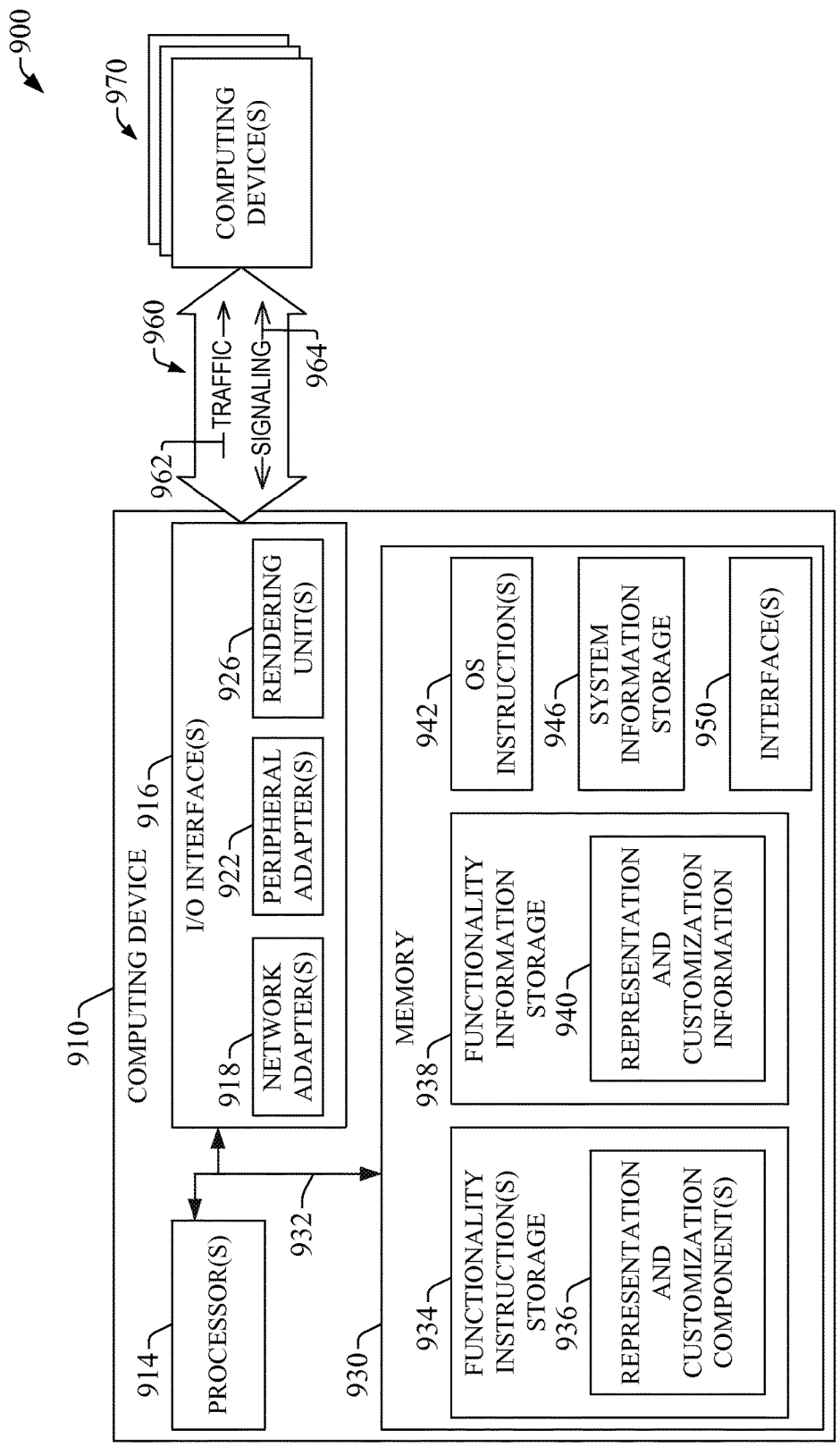
FIGS. 9A-10 illustrate example operational environments in accordance with one or more aspects of the disclosure.
Figure 9B:
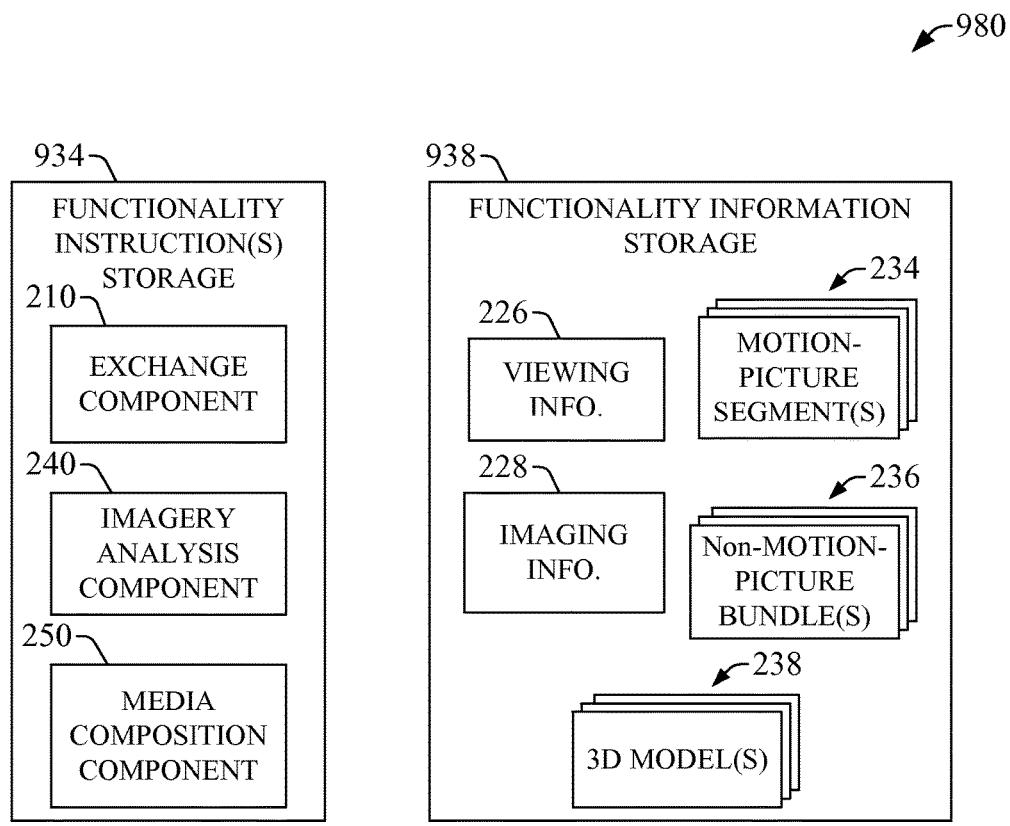
Figure 10:
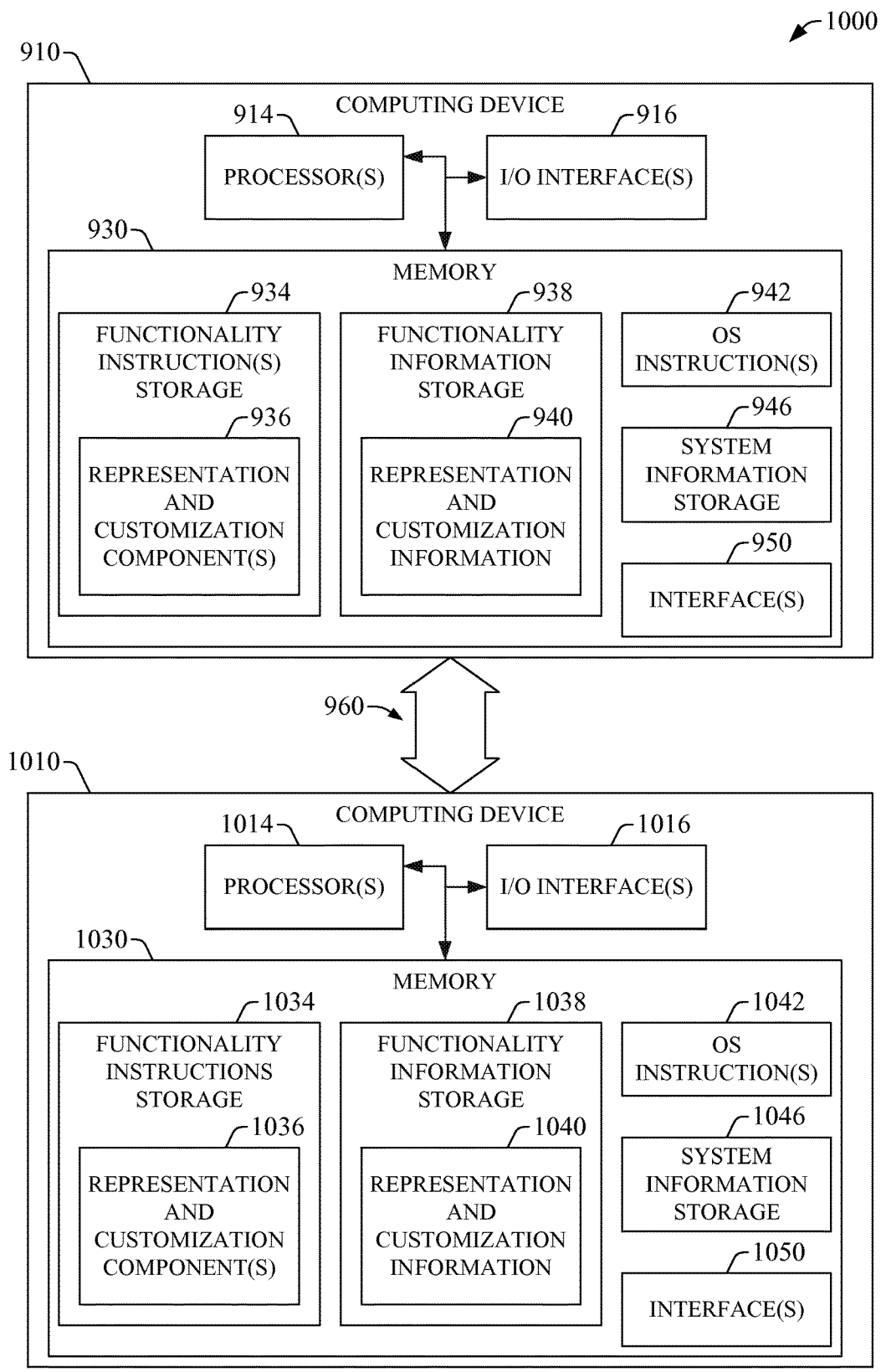

FIGS. 9A, 9B, and 10 illustrate high-level block diagrams of example operational environments for customization of media representations of an object in accordance with one or more aspects of the disclosure. These example operational environments are only illustrative and are not intended to suggest or otherwise convey any limitation as to the scope of use or functionality of the operating environments' architecture. In addition, the operational environments should not be interpreted as having any dependency or requirement relating to any one or combination of components illustrated in these example operational environments.

The operational environment 900 represents an example software implementation of the various aspects or features of the disclosure in which the processing or execution of operations described in connection with customization of a media representation of an object can be performed in response to execution of one or more software components at the computing device 910. It should be appreciated that the one or more software components can render the computing device 910, or any other computing device that contains such components, a particular machine for customization of a media representation of an object as described herein, among other functional purposes. A software component can be embodied in or can comprise one or more computer-accessible instructions, e.g., computer-readable and/or computer-executable instructions. In one scenario, at least a portion of the computer-accessible instructions can embody one or more of the example methods presented in FIGS. 11-14. For instance, to embody one such method, at least the portion of the computer-accessible instructions can be persisted in a computer storage non-transitory medium and executed by a processor. The one or more computer-accessible instructions that embody a software component can assembled into one or more program modules, for example, that can be compiled, linked, and/or executed at the computing device 910 or other computing devices. Generally, such program modules comprise computer code, routines, programs, objects, components, information structures (e.g., data structures and/or metadata structures), etc., that can perform particular tasks (e.g., one or more operations) in response to execution by one or more processors, which can be integrated into the computing device 910 or functionally coupled thereto.

The various example embodiments of the disclosure can be operational with numerous other general purpose or special purpose computing system environments or configurations. Examples of well-known computing systems, environments, and/or configurations that can be suitable for implementation of various aspects or features of the disclosure in connection with customization of a media representation of an object can comprise personal computers; server computers; laptop devices; handheld computing devices, such as mobile tablets; wearable computing devices; and multiprocessor systems. Additional examples can include set top boxes, programmable consumer electronics, network PCs, minicomputers, mainframe computers, blade computers, programmable logic controllers, distributed computing environments that comprise any of the above systems or devices, and the like.

As illustrated, the computing device 910 can comprise one or more processors 914, one or more input/output (I/O) interfaces 916, a memory 930, and a bus architecture 932 (also termed bus 932) that functionally couples various functional elements of the computing device 910. The bus 932 can include at least one of a system bus, a memory bus, an address bus, or a message bus, and can permit exchange of information (data, metadata, and/or signaling) between the processor(s) 914, the I/O interface(s) 916, and/or the memory 930, or respective functional element therein. In certain scenarios, the bus 932 in conjunction with one or more internal programming interfaces 950 (also referred to as interface(s) 950) can permit such exchange of information. In scenarios in which processor(s) 914 include multiple processors, the computing device 910 can utilize parallel computing.

The I/O interface(s) 916 permit communication of information between the computing device and an external device, such as another computing device, e.g., a network element or an end-user device. Such communication can include direct communication or indirect communication, such as exchange of information between the computing device 910 and the external device via a network or elements thereof. As illustrated, the I/O interface(s) 916 can comprise one or more of network adapter(s) 918, peripheral adapter(s) 922, and rendering unit(s) 926. Such adapter(s) can permit or facilitate connectivity between the external device and one or more of the processor(s) 914 or the memory 930. In one aspect, at least one of the network adapter(s) 918 can couple functionally the computing device 910 to one or more computing devices 970 via one or more traffic and signaling pipes 960 that can permit or facilitate exchange of traffic 962 and signaling 964 between the computing device 910 and the one or more computing devices 970. Such network coupling provided at least in part by the at least one of the network adapter(s) 918 can be implemented in a wired environment, a wireless environment, or both. The information that is communicated by the at least one network adapter can result from implementation of one or more operations in a method of the disclosure. Such output can be any form of visual representation, including, but not limited to, textual, graphical, animation, audio, tactile, and the like. In certain scenarios, each of the computing device(s) 970 can have substantially the same architecture as the computing device 910. In addition or in the alternative, the rendering unit(s) 926 can include functional elements (e.g., lights, such as light-emitting diodes; a display, such as liquid crystal display (LCD), combinations thereof, or the like) that can permit control of the operation of the computing device 910, or can permit conveying or revealing operational conditions of the computing device 910.

In one aspect, the bus 932 represents one or more of several possible types of bus structures, including a memory bus or memory controller, a peripheral bus, an accelerated graphics port, and a processor or local bus using any of a variety of bus architectures. As an illustration, such architectures can comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI) bus, a PCI-Express bus, a Personal Computer Memory Card Industry Association (PCMCIA) bus, Universal Serial Bus (USB) and the like. The bus 932, and all buses described herein can be implemented over a wired or wireless network connection and each of the subsystems, including the processor(s) 914, the memory 930 and memory elements therein, and the I/O interface(s) 916 can be contained within one or more remote computing devices 970 at physically separate locations, connected through buses of this form, in effect implementing a fully distributed system.

The computing device 910 can comprise a variety of computer-readable media. Computer readable media can be any available media (transitory and non-transitory) that can be accessed by a computing device. In one aspect, computer-readable media can comprise computer non-transitory storage media (or computer-readable non-transitory storage media) and communications media. Example computer-readable non-transitory storage media can be any available media that can be accessed by the computing device 910, and can comprise, for example, both volatile and nonvolatile media, and removable and/or non-removable media. In one aspect, the memory 930 can comprise computer-readable media in the form of volatile memory, such as random access memory (RAM), and/or non-volatile memory, such as read only memory (ROM).

The memory 930 can comprise functionality instructions storage 934 and functionality information storage 938. The functionality instructions storage 934 can comprise computer-accessible instructions that, in response to execution (by at least one of the processor(s) 914), can implement one or more of the functionalities of the disclosure. The computer-accessible instructions can embody or can comprise one or more software components illustrated as representation and customization component(s) 936. In one scenario, execution of at least one component of the representation and customization component(s) 936 can implement one or more of the example methods 1100 through 1400. For instance, such execution can cause a processor that executes the at least one component to carry out a disclosed example method. It should be appreciated that, in one aspect, a processor of the processor(s) 914 that executes a representation and customization component 936 can retrieve information from or retain information in a memory element 940 in the functionality information storage 938 in order to operate in accordance with the functionality programmed or otherwise configured by the representation and customization component(s) 936. Such information can include at least one of code instructions, information structures, or the like. At least one of the one or more interfaces 950 (e.g., application programming interface(s)) can permit or facilitate communication of information between two or more components within the functionality instructions storage 934. The information that is communicated by the at least one interface can result from implementation of one or more operations in a method of the disclosure. In certain embodiments, one or more of the functionality instructions storage 934 and the functionality information storage 938 can be embodied in or can comprise removable/non-removable, and/or volatile/non-volatile computer storage media.

At least a portion of at least one of representation and customization component(s) 936 or representation and customization information 940 can program or otherwise configure one or more of the processors 914 to operate at least in accordance with the functionality described herein. In one embodiment, e.g., embodiment 980 in FIG. 9B, the representation and customization component(s) 936 contained in the functionality instruction(s) storage 934 can include the exchange component 210, the imagery analysis component 240, and the media composition component 250. It should be recognized that in such embodiment, hardware or firmware functional elements of the exchange component 210 can be embodied in suitable components of the computing device 910. For instance, at least one of the processors 914 and at least one of the I/O interface(s) 916 (e.g., a network adapter) can embody a communication unit of the exchange component 210 (see, e.g., FIG. 8). In addition, in embodiment 980, the functionality information storage 938 can comprise the viewing info. 226, the imaging info. 228, the motion picture segment(s) 234, and the non-motion-picture bundle(s) 236. One or more of the processor(s) 914 can execute at least one of such components and leverage at least a portion of the information in the storage 938 in order to provide customization of a media representation of a three-dimensional object in accordance with one or more aspects described herein.

It should be appreciated that, in certain scenarios, the functionality instruction(s) storage 934 can embody or can comprise a computer-readable non-transitory storage medium having computer-accessible instructions that, in response to execution, cause at least one processor (e.g., one or more of processor(s) 914) to perform a group of operations comprising the operations or blocks described in connection with the disclosed methods. Such computer-readable non-transitory storage medium can embody or can be contained in a computer program product or article of manufacture. For example, in one embodiment, computer-accessible instructions contained in such computer-readable non-transitory storage medium can cause, in response to execution, at least one processor to carry out operations comprising accessing information indicative of a plurality of vantage points respective to an object, the plurality of vantage points respective to the object is respectively associated with a plurality of images of the object; determining a viewing relevancy weight for each vantage point in the plurality of vantage points respective to the object; determining a number of instances of each vantage point in the plurality of vantage points respective to the object; determining a viewing preference weight for each vantage point in the plurality of vantage points respective to the object based at least on the viewing relevancy weight of the vantage point and the number of instances of the vantage point; determining one or more groups of vantage points in the plurality of vantage points respective to the object based at least on the viewing preference weight of at least one vantage point in the group of vantage points; and classifying an image of the object associated with a vantage point in each of the one or more groups of vantage points as a marketable view of the object, thereby generating a plurality of marketable views. In addition or in the alternative, in one aspect, the operations can comprise selecting a group of the plurality of marketable views for transmission to a destination device having specific communication resources. In another additional or alternative aspect, the operations can comprise composing a media asset having at least one marketable view of the group based at least in part on the communication resources.

In another scenario, the functionality instruction(s) storage 934 can embody or can comprise a computer-readable non-transitory storage medium having computer-accessible instructions that, in response to execution, cause at least one processor (e.g., one or more of processor(s) 914) to perform a group of operations comprising receiving, at a computing device, information indicative of a communication resource available to a destination device; and configuring, at the computing device, based at least on the communication resource, a content delivery format for transmitting at least one view of a plurality of marketable views to the destination device, wherein the content delivery format comprises one of a non-motion-picture delivery format, a three-dimensional model, or a motion-picture format. In one aspect, the configuring can comprise ascertaining that the communication resource is less than a resource threshold and, in response, selecting a non-motion-picture delivery format. In another aspect, the configuring can comprise ascertaining that the communication resource is greater than or equal to a resource threshold and, in response, selecting a motion-picture delivery format. In addition or in the alternative, the operations associated with such computer-readable non-transitory storage medium can comprise supplying, by the computing device, the at least one view of the plurality of marketable views to the destination device according to the delivery format, wherein each of the plurality of marketable views comprises a digital image of the object from a specific vantage point. In one aspect, the supplying comprises transmitting the at least one view of the plurality of marketable views to the destination device according to the non-motion-picture delivery format. In another aspect, the supplying comprises transmitting a plurality of specific views of the object to the destination device according to the motion-picture delivery format, the plurality of specific views comprises the at least one view of the plurality of marketable views. In yet another aspect, the supplying comprises selecting one or more views of the plurality of marketable views for transmission to the destination device. In still another aspect, the supplying further comprises transmitting the one or more views to the destination device according to the delivery format.

In addition, the memory 930 can comprise computer-accessible instructions and information (e.g., data and/or metadata) that permit or facilitate operation and/or administration (e.g., upgrades, software installation, any other configuration, or the like) of the computing device 910. Accordingly, as illustrated, the memory 930 can comprise a memory element 942 (labeled operating system (OS) instruction(s) 942) that contains one or more program modules that embody or include one or more OSs, such as Windows operating system, Unix, Linux, Symbian, Android, Chromium, and substantially any OS suitable for mobile computing devices or tethered computing devices. In one aspect, the operational and/or architecture complexity of the computing device 910 can dictate a suitable OS. The memory 930 also comprises a system information storage 946 having data and/or metadata that permits or facilitate operation and/or administration of the computing device 910. Elements of the OS instruction(s) 942 and the system information storage 946 can be accessible or can be operated on by at least one of the processor(s) 914.

It should be recognized that while the functionality instructions storage 934 and other executable program components, such as the operating system instruction(s) 942, are illustrated herein as discrete blocks, such software components can reside at various times in different memory components of the computing device 910, and can be executed by at least one of the processor(s) 914. In certain scenarios, an implementation of the representation and customization component(s) 936 can be retained on or transmitted across some form of computer readable media.

The computing device 910 and/or one of the computing device(s) 970 can include a power supply (not shown), which can power up components or functional elements within such devices. The power supply can be a rechargeable power supply, e.g., a rechargeable battery, and it can include one or more transformers to achieve a power level suitable for operation of the computing device 910 and/or one of the computing device(s) 970, and components, functional elements, and related circuitry therein. In certain scenarios, the power supply can be attached to a conventional power grid to recharge and ensure that such devices can be operational. In one aspect, the power supply can include an I/O interface (e.g., one of the network adapter(s) 918) to connect operationally to the conventional power grid. In another aspect, the power supply can include an energy conversion component, such as a solar panel, to provide additional or alternative power resources or autonomy for the computing device 910 and/or one of the computing device(s) 970.

The computing device 910 can operate in a networked environment by utilizing connections to one or more remote computing devices 970. As an illustration, a remote computing device can be a personal computer, a portable computer, a server, a router, a network computer, a peer device or other common network node, and so on. As described herein, connections (physical and/or logical) between the computing device 910 and a computing device of the one or more remote computing devices 970 can be made via one or more traffic and signaling pipes 960, which can comprise wireline link(s) and/or wireless link(s) and several network elements (such as routers or switches, concentrators, servers, and the like) that form a local area network (LAN) and/or a wide area network (WAN). Such networking environments are conventional and commonplace in dwellings, offices, enterprise-wide computer networks, intranets, local area networks, and wide area networks.

In one or more embodiments, such as example embodiment 1000 shown in FIG. 10, one or more of the disclosed methods can be practiced in distributed computing environments, such as grid-based environments, where tasks can be performed by remote processing devices (computing device(s) 970) that are functionally coupled (e.g., communicatively linked or otherwise coupled) through a network having traffic and signaling pipes and related network elements. In a distributed computing environment, in one aspect, one or more software components (such as program modules) can be located in both a local computing device 910 and at least one remote computing device, such as computing device 1010. As illustrated and described herein, the at least one remote computing device, e.g., computing device 1010, can have substantially the same architecture and associated functionality as the computing device 910. For instance, the computing device 1010 can comprise processor(s) 1014, I/O interface(s) 1016, and a memory 1030, where a bus architecture can couple functionally two or more of such elements. The memory 1030 can comprise a functionality instructions storage 1034 having one or more representation and customization component(s) 1036, and a functionality information storage 1038 having representation and customization information 1040. The memory 1030 also can comprise OS instruction(s) 1042 and system information storage 1046 that can permit, at least in part, operation and/or administration of the computing device 1010. One or more internal programming interfaces 1050 (represented as interface(s) 1050 in FIG. 10) can permit or facilitate exchange of information between the representation and customization component(s) 1036 and the functionality information storage 1038. In a scenario in which several components are present in the group of representation and customization component(s) 1036, at least one interface of the interface(s) 1050 can permit or facilitate exchange of information between at least two of such components.

In one implementation, the computing device 910 and the computing device 1010 can embody or can comprise the exchange component 210, and the imagery analysis component 240 and the media composition component 250, respectively. Other distribution of the exchange component 210, the imagery analysis component 240, and the media composition component 250 can be implemented. Similarly, the viewing information 226, the imaging information 228, the motion-picture segment(s) 234, and the non-motion picture bundle(s) 236 also can be distributed between the computing device 910 and the computing device 1010.

In view of the aspects described herein, example methods that can be implemented in accordance with the disclosure can be better appreciated with reference to the flowcharts in FIGS. 11-14. For purposes of simplicity of explanation, the example methods disclosed herein are presented and described as a series of blocks (with each block representing an action or an operation in a method, for example). However, it is to be understood and appreciated that the disclosed methods are not limited by the order of blocks and associated actions or operations, as some blocks may occur in different orders and/or concurrently with other blocks from that are shown and described herein. For example, the various methods or processes of the disclosure can be alternatively represented as a series of interrelated states or events, such as in a state diagram. Furthermore, not all illustrated blocks, and associated action(s), may be required to implement a method in accordance with one or more aspects of the disclosure. Further yet, two or more of the disclosed methods or processes can be implemented in combination with each other, to accomplish one or more features or advantages described herein.

It should be appreciated that the methods of the disclosure can be retained on an article of manufacture, or computer-readable medium, to permit or facilitate transporting and transferring such methods to a computing device (e.g., a desktop computer; a mobile computer, such as an electronic book reader (e-reader) or other tablets, or a smartphone; a gaming console, a mobile telephone; a blade computer; a programmable logic controller, and the like) for execution, and thus implementation, by a processor of the computing device or for storage in a memory thereof or functionally coupled thereto. In one aspect, one or more processors, such as processor(s) that implement (e.g., execute) one or more of the disclosed methods, can be employed to execute code instructions retained in a memory, or any computer- or machine-readable medium, to implement the one or more methods. The code instructions can provide a computer-executable or machine-executable framework to implement the methods described herein.

Figure 11:
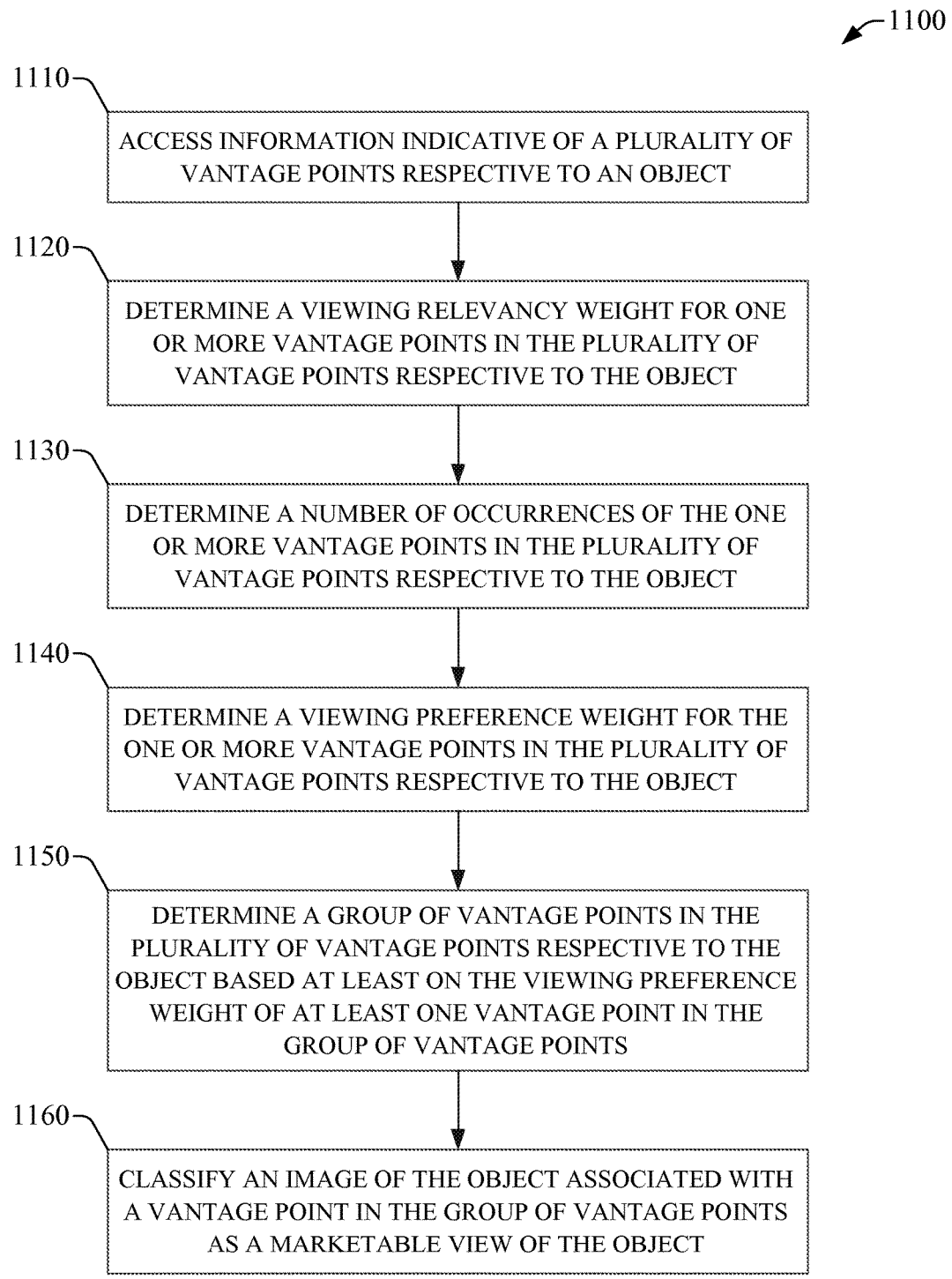
FIGS. 11-14 present example methods in accordance with one or more aspects of the disclosure.

FIG. 11 is a flowchart of an example method for identifying a group of marketable views of a three-dimensional object. As described herein, such group can be referred to as a "hotspot" of the object. In certain scenarios, a computing device that has at least one processor or is functionally coupled to at least one processor can implement (e.g., compile, execute, compile and execute, etc.) one or more blocks of the subject example method 1100. In other scenarios, one or more blocks of the example method 1100 can be implemented in a distributed fashion by two or more computing devices contained in a system. Each of the two or more computing devices can have at least one processor or can be functionally coupled to at least one processor, where such processor(s) can implement at least one of the one or more blocks.

At block 1110, information indicative of a plurality of vantage points respective to an object is accessed. At block 1120, a viewing relevancy weight is determined for one or more vantage points (e.g., each vantage point) in the plurality of vantage points respective to the object. Block 1120 can be referred to as a determining action, which in one aspect can comprise determining a viewing time for each of the one or more vantage points in the plurality of vantage points. In addition, determining the viewing relevancy weight can include assigning a value of a function of the viewing time for each of the one or more vantage points in the plurality of vantage points respective to the object to be indicative of the viewing relevancy weight for the vantage point. At block 1130, a number of instances of the one or more vantage points of the plurality of vantage points is determined. At block 1140, a viewing preference weight is determined for the one or more vantage points in the plurality of vantage points respective to the object.

At block 1150, a group of vantage points in the plurality of vantage points is determined based at least on the viewing preference weight of the at least one vantage point in the group of vantage points. At block 1160, an image of the object associated with a vantage point of the group of vantage points is classified as a marketable view of the object. It should be appreciated that, in certain embodiments, blocks 1150 and 1160 can be implemented in several instances in order to analyze or inspect the plurality of vantage points in its entirety or substantially in its entirety and, based on outcome of such analysis or inspection, determine one or more alternative groups of vantage points. For example, in certain embodiments, the example method 1100 can comprise determining at least one alternative group of vantage points in the plurality of vantage points respective to the object based at least on the viewing preference weight of each vantage point in the at least one alternative group of vantage points. In addition, in such embodiments, the example method can comprise classifying at least one image of the object associated with at least one vantage point in the at least one alternative group of vantage points as at least one alternative marketable view of the object. Determination of a group of vantage points and alternative group(s) of vantage points and/or classification of an image associated with the object within such group(s) can yield a plurality of marketable views of the object comprising the marketable view and the at least one alternative marketable view.

Figure 12:
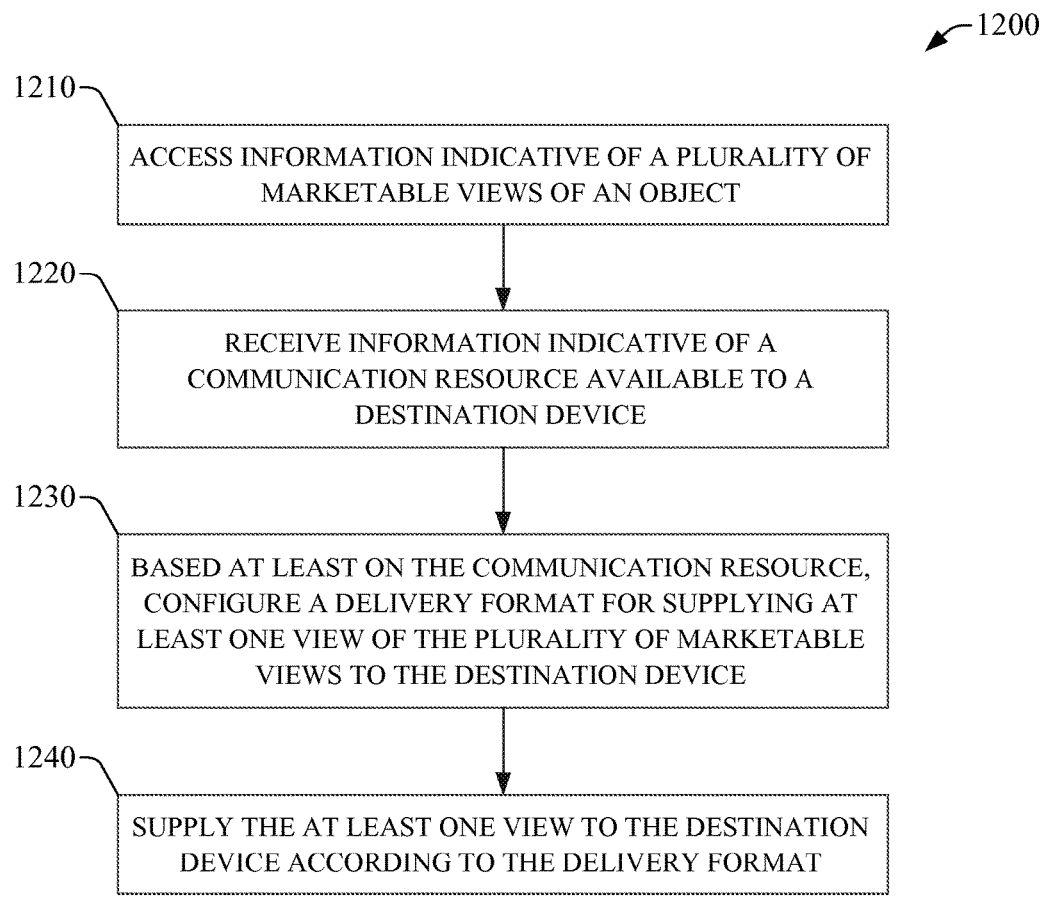

Generation of the plurality of marketable views can permit or facilitate selecting a group of the plurality of marketable views for transmission to a destination device (e.g., a mobile tablet, a smartphone, an end-point display) having specific communication resources. In certain scenarios, such selecting action can be part of providing one or more views of the group of marketable views. As an illustration, in one embodiment, FIG. 12 is a flowchart of an example method for providing a marketable view of an object to the destination device in accordance with one or more aspects of the disclosure. In certain scenarios, a computing device that has at least one processor or is functionally coupled to at least one processor can implement (e.g., compile, execute, compile and execute, etc.) one or more blocks of the subject example method 1200. In other scenarios, one or more blocks of the example method 1200 can be implemented in a distributed fashion by two or more computing devices contained in a system. Each of the two or more computing devices can have at least one processor or can be functionally coupled to at least one processor, where such processor(s) can implement at least one of the one or more blocks.

At block 1210, information indicative of a plurality of marketable views of an object are accessed. At block 1220, information indicative of a communication resource available to a destination device is received. The communication resource can comprise, for example, bandwidth and/or communication channel(s). At block 1230, a delivery format for supplying (e.g., transmitting, encoding and transmitting, etc.) at least one view of the plurality of marketable views is configured based at least in part on the communication resource. The delivery format can comprise one of a non-motion-picture delivery format, a three-dimensional model (such as a full three-dimensional model), or a motion-picture format. The three-dimensional model of the object can comprise information indicative of the object and can permit perusal or navigation of the object. In one aspect, the non-motion-picture delivery format can comprise most any digital image format, such as JPEG. In another aspect, the motion-picture format can comprise most any video format, such as MPEG-4, H.264, Rec. 601, or the like. Block 1230 can be referred to as a configuring action, which in one implementation can comprise ascertaining that the communication resource is less than a resource threshold (e.g., a predetermined bandwidth) and, in response, selecting the non-motion-picture delivery format. In another implementation, the configuring action can comprise ascertaining that the communication resource is greater than or equal to the resource threshold and, in response, selecting the motion-picture delivery format.

At block 1240, the at least one view of the plurality of marketable views is supplied to the destination device according to the delivery format. As described herein in connection with FIG. 1, for example, each of the plurality of marketable views can comprise a digital image of the object from a specific vantage point. Block 1240 can be referred to as a supplying action, which in one implementation can comprise transmitting the at least one view of the plurality of preferred views to the destination device according to the non-motion-picture delivery format. In another implementation, the supplying action can comprise transmitting a plurality of specific views of the object to the destination device according to the motion-picture delivery format. In such implementation, the plurality of specific views can comprise the at least one marketable view of the plurality of marketable views. In yet another implementation, the supplying action can comprise selecting one or more views of the plurality of preferred views for transmission to the destination device. Further, the supplying can comprise transmitting the selected one or more views to the destination device according to the delivery format.

Figure 13:
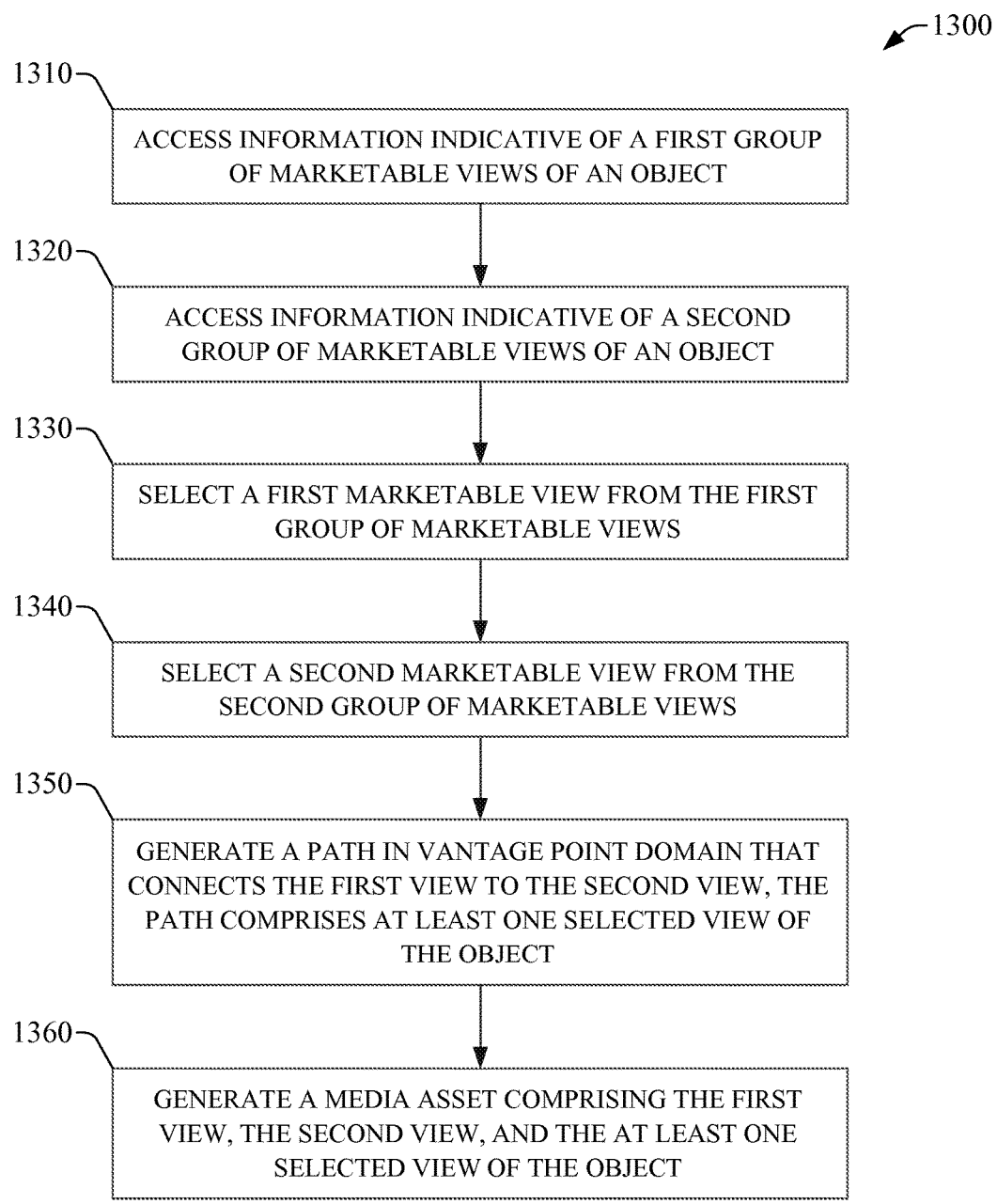

FIG. 13 is a flowchart of an example method 1300 for composing a group of marketable view of a three-dimensional object. In certain scenarios, a computing device that has at least one processor or is functionally coupled to at least one processor can implement (e.g., compile, execute, compile and execute, etc.) one or more blocks of the subject example method 1300. In other scenarios, one or more blocks of the example method 1300 can be implemented in a distributed fashion by two or more computing devices contained in a system. Each of the two or more computing devices can have at least one processor or can be functionally coupled to at least one processor, where such processor(s) can implement at least one of the one or more blocks.

At block 1310, information indicative of a first group of marketable views of an object is accessed. At block 1320, information indicative of a second group of marketable views of an object is accessed. At block 1330, a first marketable view is selected from the first group of marketable views. At block 1340, a second marketable view is selected from the second group of marketable views. At block 1350, a path in vantage domain that connects the first view and the second view is generated—see, e.g., FIG. 7. As described herein, in one aspect, the path can be the shortest path in Euclidian three-dimensional space that connects the first view with the second view. In addition or in the alternative, in another aspect, the path can be the shortest path on a two-dimensional topology in Euclidian three-dimensional space. The path can comprise at least one (e.g., one, two, more than two, etc.) selected view of the object. At block 1360, a media asset comprising the first view, the second view, and the at least one selected view is generated. In one aspect, the media asset is suitable for transmission to a destination device (e.g., a mobile tablet, a smartphone, etc.) having specific communication resources (e.g., bandwidth, communication channel(s), etc.).

Figure 14:
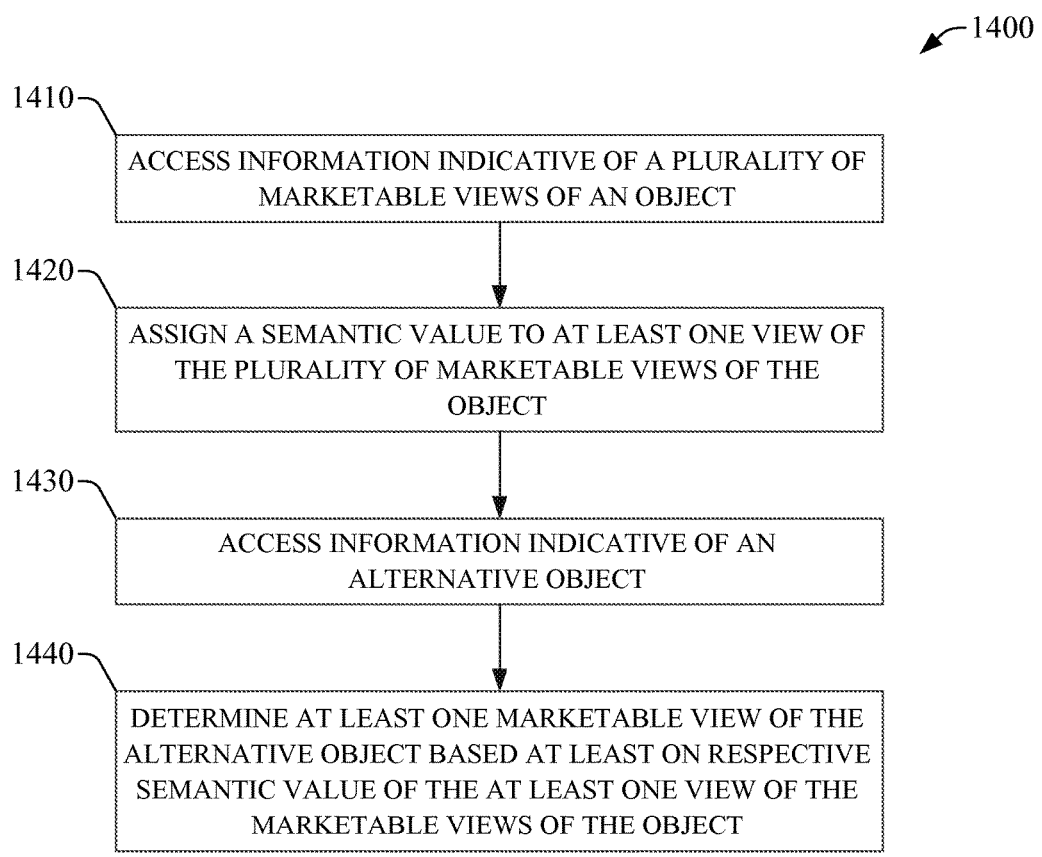

FIG. 14 is a flowchart of an example method for generating a marketable view in accordance with one or more aspects of the disclosure. In certain scenarios, a computing device that has at least one processor or is functionally coupled to at least one processor can implement (e.g., compile, execute, compile and execute, etc.) one or more blocks of the subject example method 1300. In other scenarios, one or more blocks of the example method 1300 can be implemented in a distributed fashion by two or more computing devices contained in a system. Each of the two or more computing devices can have at least one processor or can be functionally coupled to at least one processor, where such processor(s) can implement at least one of the one or more blocks.

At block 1410, information indicative of a plurality of marketable views of an object is accessed. At block 1420, a semantic value is assigned to at least one view of the plurality of marketable views of the object. The semantic value can be a string value, a numeric value, or an alphanumeric value. In one implementation, a semantic value can be assigned to each of the plurality of marketable views, thereby generating a plurality of semantic values for respective marketable views of the object. At block 1430, information indicative of an alternative object is accessed. At block 1440, at least one marketable view of the alternative object is determined based at least in part on respective semantic values of the at least one view of the marketable views of the object. Block 1440 can be referred to as a determining action, which in one aspect can comprise predicting at least one preferred view for an alternative object based at least on one or more of the plurality of semantic values for the object.

Unless otherwise expressly stated, it is in no way intended that any protocol, procedure, process, or method set forth herein be construed as requiring that its acts or steps be performed in a specific order. Accordingly, where a process or method claim does not actually recite an order to be followed by its acts or steps or it is not otherwise specifically recited in the claims or descriptions of the subject disclosure that the steps are to be limited to a specific order, it is in no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification or annexed drawings, or the like.

As used in this application, the terms "component," "environment," "system," "architecture," "interface," "unit," "module," and the like are intended to refer to a computer-related entity or an entity related to an operational apparatus with one or more specific functionalities. Such entities may be either hardware, a combination of hardware and software, software, or software in execution. As an example, a component may be, but is not limited to being, a process running on a processor, a processor, an object, an executable portion of software, a thread of execution, a program, and/or a computing device. For example, both a software application executing on a computing device and the computing device can be a component. One or more components may reside within a process and/or thread of execution. A component may be localized on one computing device or distributed between two or more computing devices. As described herein, a component can execute from various computer-readable non-transitory media having various data structures stored thereon. Components can communicate via local and/or remote processes in accordance, for example, with a signal (either analogic or digital) having one or more data packets (e.g., data from one component interacting with another component in a local system, distributed system, and/or across a network such as a wide area network with other systems via the signal). As another example, a component can be an apparatus with specific functionality provided by mechanical parts operated by electric or electronic circuitry that is controlled by a software application or firmware application executed by a processor, wherein the processor can be internal or external to the apparatus and can execute at least a part of the software or firmware application. As yet another example, a component can be an apparatus that provides specific functionality through electronic components without mechanical parts, the electronic components can include a processor therein to execute software or firmware that confers at least in part the functionality of the electronic components. An interface can include input/output (I/O) components as well as associated processor, application, and/or other programming components. The terms "component," "environment," "system," "architecture," "interface," "unit," "module" can be utilized interchangeably and can be referred to collectively as functional elements.

In the present specification and annexed drawings, reference to a "processor" is made. As utilized herein, a processor can refer to any computing processing unit or device comprising single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit (IC), an application-specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. A processor can be implemented as a combination of computing processing units. In certain embodiments, processors can utilize nanoscale architectures such as, but not limited to, molecular and quantum-dot based transistors, switches and gates, in order to optimize space usage or enhance performance of user equipment.

In addition, in the present specification and annexed drawings, terms such as "store," storage," "data store," "data storage," "memory," "repository," and substantially any other information storage component relevant to operation and functionality of a component of the disclosure, refer to "memory components," entities embodied in a "memory," or components forming the memory. It can be appreciated that the memory components or memories described herein embody or comprise non-transitory computer storage media that can be readable or otherwise accessible by a computing device. Such media can be implemented in any methods or technology for storage of information such as computer-readable instructions, information structures, program modules, or other information objects. The memory components or memories can be either volatile memory or non-volatile memory, or can include both volatile and non-volatile memory. In addition, the memory components or memories can be removable or non-removable, and/or internal or external to a computing device or component. Example of various types of non-transitory storage media can comprise hard-disc drives, zip drives, CD-ROM, digital versatile disks (DVD) or other optical storage, magnetic cassettes, magnetic tape, magnetic disk storage or other magnetic storage devices, flash memory cards or other types of memory cards, cartridges, or any other non-transitory medium suitable to retain the desired information and which can be accessed by a computing device.

As an illustration, non-volatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The disclosed memory components or memories of operational environments described herein are intended to comprise one or more of these and/or any other suitable types of memory.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language generally is not intended to imply that features, elements, and/or operations are in any way required for one or more implementations or that one or more implementations necessarily include logic for deciding, with or without user input or prompting, whether these features, elements, and/or operations are included or are to be performed in any particular implementation.

What has been described herein in the present specification and annexed drawings includes examples of systems, devices, and techniques that can provide a customized media representation of an object. It is, of course, not possible to describe every conceivable combination of elements and/or methods for purposes of describing the various features of the disclosure, but it can be recognize that many further combinations and permutations of the disclosed features are possible. Accordingly, it may be apparent that various modifications can be made to the disclosure without departing from the scope or spirit thereof. In addition or in the alternative, other embodiments of the disclosure may be apparent from consideration of the specification and annexed drawings, and practice of the disclosure as presented herein. It is intended that the examples put forward in the specification and annexed drawings be considered, in all respects, as illustrative and not restrictive. Although specific terms are employed herein, they are used in a generic and descriptive sense only and not for purposes of limitation.

What is claimed is:

1. A method comprising:
   accessing, by an exchange component in a system having at least one processor and a memory, information indicative of a plurality of vantage points respective to an object, wherein the plurality of vantage points respective to the object are associated with a number of images of the object, and wherein the number of images comprises a first image associated with a vantage point in the plurality of vantage points;
   determining, by the system, a duration of time that the first image is viewed;

determining, by the system, based at least in part on the duration of time, a viewing relevancy weight for the vantage point, wherein the viewing relevancy weight is proportional to the duration of time;

determining, by the system, a number of times the first image is viewed;

determining, by the system, a viewing preference weight for the vantage point based at least in part on the viewing relevancy weight and the number of times the first image is viewed;

determining, by the system, one or more groups of vantage points in the plurality of vantage points based at least in part on the viewing preference weight;

selecting, by the system, a marketable view of the object from the one or more groups of vantage points using the viewing preference weight; and generating, by the system, a customized media representation of the object using the marketable view, wherein the customized media representation of the object comprises fewer images of the object than the number of images of the object.

2. The method of claim 1, further comprising:

selecting, by the system, the marketable view for transmission to a destination device having specific communication resources.

3. The method of claim 2, further comprising:

composing, by the system, a media asset having at least one marketable view of the one or more groups of vantage points based at least in part on the specific communication resources.

4. A system to customize media representation of objects, comprising:

at least one memory having computer-accessible instructions; and at least one processor functionally coupled to the at least one memory and configured by at least a portion of the computer-accessible instructions, to access, by an exchange component, information indicative of a plurality of vantage points respective to an object, the plurality of vantage points respective to the object is respectively associated with a number of images of the object, wherein the number of images comprises a first image associated with a vantage point in the plurality of vantage points;

to determine a duration of time that the first image is viewed;

to determine, based at least in part on the duration of time, a viewing relevancy weight for the vantage point, wherein the viewing relevancy weight is proportional to the duration of time;

to determine a number of times the first image is viewed;

to determine a viewing preference weight for the vantage point based at least in part on the viewing relevancy weight and the number of times the first image is viewed;

to determine a group of vantage points in the plurality of vantage points based at least in part on the viewing preference weight;

to select a marketable view of the object from the group of vantage points using the viewing preference weight; and to generate a customized media representation of the object using the marketable view, wherein the customized media representation of the object comprises fewer images of the object than the number of images of the object.

5. The system of claim 4, wherein the at least one processor is further configured to determine at least one additional group of vantage points in the plurality of vantage points respective to the object based at least in part on a viewing preference weight of at least one vantage point in the at least one additional group of vantage points.

6. The system of claim 5, wherein the at least one processor is further configured to classify at least one image of the object associated with at least one vantage point in the at least one additional group of vantage points as at least one alternative marketable view of the object, thereby generating a plurality of marketable views of the object comprising the marketable view and the at least one alternative marketable view.

7. The system of claim 6, wherein the at least one processor is further configured to select the marketable view for transmission to a destination device having specific communication resources.

8. The system of claim 6, wherein the at least one processor is further configured to acquire a path in vantage point domain, the path connects the marketable view and a second marketable view, wherein the path comprises a plurality of selected vantages points having the number of images of the object respectively associated therewith.

9. The system of claim 8, wherein the at least one processor is further configured to compose a media asset comprising the number of images, the marketable view and a second marketable view, wherein the media asset is suitable for transmission to a destination device having specific communication resources.

10. The system of claim 6, wherein the at least one processor is further configured to assign a semantic value to the marketable view of the object, thereby generating a plurality of semantic values for the object.

11. The system of claim 10, wherein the at least one processor is further configured to predict at least one marketable view for an alternative object based at least in part on one or more of the plurality of semantic values for the object.

12. A computer-readable non-transitory storage medium having computer-accessible instructions that, in response to execution, cause at least one processor to perform operations comprising:

receiving, by an exchange component in a computing device, information indicative of a communication resource available to a destination device; and configuring, at the computing device, based at least in part on the communication resource, a content delivery format for transmitting a number of views of an object to the destination device;

determining a duration of time that a first image of the object is viewed, wherein the first image is associated with a vantage point;

determining, based at least in part on the duration of time, a viewing relevancy weight for the vantage point, wherein the viewing relevancy weight is proportional to the duration of time;

determining a viewing preference weight for the vantage point based at least in part on the viewing relevancy weight;

determining a group of vantage points based at least in part on the viewing preference weight of the vantage point;

selecting a marketable view of the object using the viewing preference weight of the vantage point; and generating a customized media representation of the object using the marketable view, wherein the customized media representation of the object comprises fewer images of the object than the number of views of the object.

13. The computer-readable non-transitory storage medium of claim 12, wherein the configuring comprises ascertaining that the communication resource is less than a resource threshold and, in response, selecting a non-motion-picture delivery format.

14. The computer-readable non-transitory storage medium of claim 12, wherein the configuring comprises ascertaining that the communication resource is greater than or equal to a resource threshold and, in response, selecting a motion-picture delivery format.

15. The computer-readable non-transitory storage medium of claim 12, wherein the vantage point is a first vantage point, wherein the operations further comprise supplying, by the computing device, the marketable view to the destination device according to the content delivery format, wherein the marketable view comprises a second image of the object from a second vantage point.

16. The computer-readable non-transitory storage medium of claim 15, wherein the supplying comprises transmitting the marketable view to the destination device according to a non-motion-picture delivery format.

17. The computer-readable non-transitory storage medium of claim 15, wherein the supplying comprises transmitting the number of views of the object to the destination device according to the content delivery format, the number of views comprising the marketable view.

18. A computer-readable non-transitory storage medium having computer-accessible instructions that, in response to execution, cause at least one processor to perform operations comprising:

accessing, by an exchange component, information indicative of a plurality of vantage points respective to an object, wherein the plurality of vantage points are associated with a number of images of the object, wherein the number of images comprises a first image associated with a vantage point in the plurality of vantage points;

determining a duration of time that the first image is viewed;

determining, based at least in part on the duration of time, a viewing relevancy weight for the vantage point, wherein the viewing relevancy weight is proportional to the duration of time;

determining a number of times the first image is viewed;

determining a viewing preference weight for the vantage point based at least in part on the viewing relevancy weight of the vantage point and the number of times the first image is viewed;

determining one or more groups of vantage points in the plurality of vantage points based at least in part on the viewing preference weight;

selecting a marketable view of the object from the one or more groups of vantage points using the viewing preference weight; and generating a customized media representation of the object using the marketable view, wherein the customized media representation of the object comprises fewer images of the object than the number of images of the object.

19. The computer-readable non-transitory storage medium of claim 18, wherein the operations further comprise selecting the marketable view for transmission to a destination device having specific communication resources.

20. The computer-readable non-transitory storage medium of claim 19, wherein the operations further comprise composing a media asset having at least one marketable view of the one or more groups of vantage points based at least in part on the specific communication resources.

* * * * *